US012543392B2

United States Patent
Shirahige et al.

(10) Patent No.: US 12,543,392 B2
(45) Date of Patent: Feb. 3, 2026

(54) PHOTOELECTRIC CONVERSION DEVICE, MANUFACTURING METHOD THEREOF, AND EQUIPMENT

(71) Applicant: CANON KABUSHIKI KAISHA, Tokyo (JP)

(72) Inventors: Daiki Shirahige, Kanagawa (JP); Hiroshi Sekine, Kanagawa (JP); Shunichi Wakashima, Tokyo (JP); Ginjiro Toyoguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 676 days.

(21) Appl. No.: 17/886,552

(22) Filed: Aug. 12, 2022

(65) Prior Publication Data
US 2023/0053980 A1    Feb. 23, 2023

(30) Foreign Application Priority Data

Aug. 17, 2021  (JP) .................................. 2021-132950

(51) Int. Cl.
*H10F 39/00* (2025.01)
*H10F 39/18* (2025.01)

(52) U.S. Cl.
CPC ....... *H10F 39/8033* (2025.01); *H10F 39/014* (2025.01); *H10F 39/18* (2025.01)

(58) Field of Classification Search
CPC ................................................... H10F 39/8033
USPC ........................................................ 257/292
See application file for complete search history.

(56) References Cited

U.S. PATENT DOCUMENTS

| | | |
|---|---|---|
| 8,921,900 B2 | 12/2014 | Iida et al. |
| 9,124,833 B2 | 9/2015 | Toyoguchi et al. |
| 9,548,328 B2 | 1/2017 | Hasegawa et al. |
| 10,381,388 B2 | 8/2019 | Toyoguchi |
| 10,483,307 B2 | 11/2019 | Sekine et al. |
| 10,535,688 B2 | 1/2020 | Onuki et al. |
| 10,645,322 B2 | 5/2020 | Sekine |

(Continued)

FOREIGN PATENT DOCUMENTS

| | | | |
|---|---|---|---|
| JP | 2020141122 A | * | 9/2020 |
| KR | 2005/0040360 A | | 5/2005 |

OTHER PUBLICATIONS

Office Action dated Mar. 4, 2024, in Japanese Patent Application No. 2021-132950.

(Continued)

*Primary Examiner* — Ajay Arora
(74) *Attorney, Agent, or Firm* — Venable LLP

(57) ABSTRACT

A pixel circuit of a photoelectric conversion device includes two photoelectric conversion elements, each including two impurity region in each of two different layers. In at least one pixel of the pixel circuits, a first separation region separating the two impurity regions in a first layer and a second separation region separating the two impurity regions in a second layer extend in directions different from each other in a planer view. An impurity region in a photoelectric conversion element includes a first portion overlapping the first separation region in the planar view, a second portion adjacent to a first transfer gate, and a third portion located on an opposite side of the second portion with respect to the first portion. The impurity region has a potential distribution monotonically decreasing from the third portion to the second portion for signal charges.

11 Claims, 19 Drawing Sheets

(56) References Cited

U.S. PATENT DOCUMENTS

| | | | |
|---|---|---|---|
| 10,805,563 B2 | 10/2020 | Ikeda et al. | |
| 10,818,708 B2 | 10/2020 | Toyoguchi | |
| 10,818,715 B2 | 10/2020 | Iwata et al. | |
| 10,848,695 B2 | 11/2020 | Miki et al. | |
| 10,868,069 B2 | 12/2020 | Toyoguchi | |
| 11,056,519 B2* | 7/2021 | Inui | H10F 39/813 |
| 11,297,273 B2 | 4/2022 | Sekine et al. | |
| 2020/0273894 A1 | 8/2020 | Inui et al. | |
| 2021/0210532 A1 | 7/2021 | Hung et al. | |
| 2022/0037380 A1 | 2/2022 | Shinohara et al. | |
| 2022/0093662 A1 | 3/2022 | Shinohara et al. | |
| 2022/0208818 A1* | 6/2022 | Song | H10F 39/80377 |

OTHER PUBLICATIONS

U.S. Appl. No. 18/051,677, filed Nov. 1, 2022 (First Named Inventor: Hiroshi Sekine).

* cited by examiner

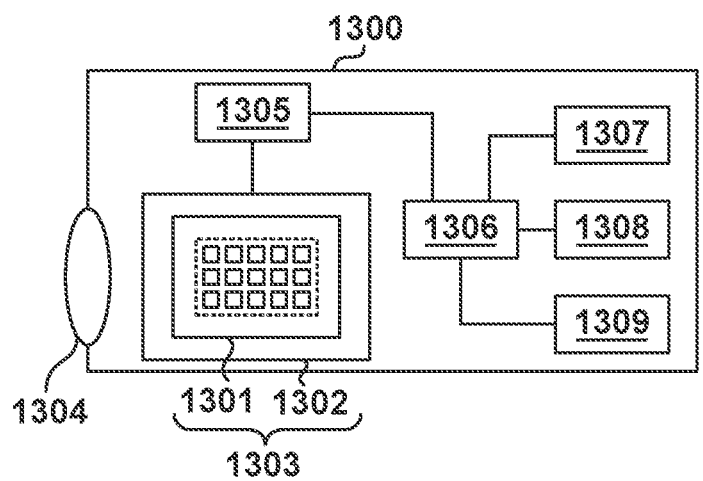
FIG. 13A
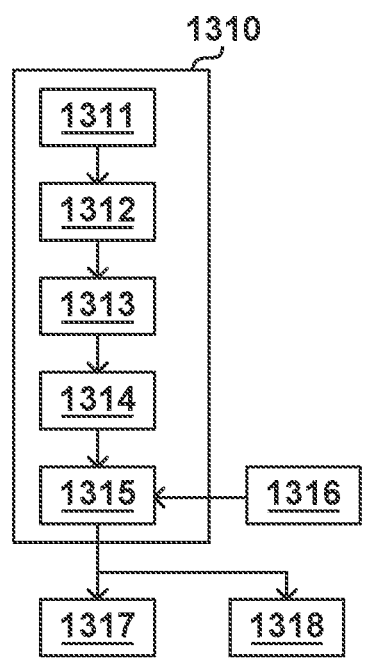
FIG. 13B
FIG. 13C
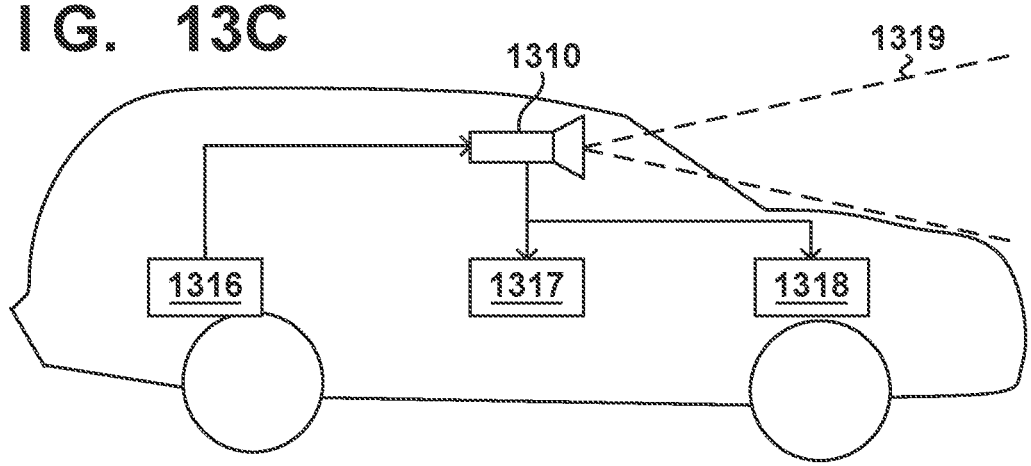

PHOTOELECTRIC CONVERSION DEVICE, MANUFACTURING METHOD THEREOF, AND EQUIPMENT

BACKGROUND OF THE INVENTION

Field of the Invention

The present invention relates to a photoelectric conversion device, a manufacturing method thereof, and an equipment.

Description of the Related Art

In order to enable image plane phase difference autofocus (AF), there has been proposed an image sensor including two photoelectric conversion elements in one pixel circuit. In Japanese Patent Laid-Open No. 2020-141122, in order to suppress a decrease in AF accuracy due to the direction of the contrast of an object, two photoelectric conversion elements are arranged in a column direction in some pixel circuits, and arranged in a row direction in other pixel circuits. Further, in order to make the circuit arrangement except for the photoelectric conversion elements the same among a plurality of pixel circuits, the impurity regions of the two photoelectric conversion elements are divided into two layers. Two impurity regions included in one layer are arranged in different directions in the plurality of pixel circuits. Two impurity regions included in the other layer are arranged in the same direction in the plurality of pixel circuits. By arranging a gate electrode with respect to the two impurity regions included in the latter layer, the gate electrodes can be arranged at the identical positions in the plurality of pixel circuits.

SUMMARY OF THE INVENTION

When the impurity regions of two photoelectric conversion elements are divided into two layers, and two impurity regions included in one layer are arranged in different directions in a plurality of pixel circuits, a potential barrier may be formed in a signal charge transport path, and this may cause a decrease in transport efficiency. One aspect of the present disclosure provides a technique for improving the signal charge transport efficiency in a photoelectric conversion element.

According to some embodiments, a photoelectric conversion device is provided. The device includes a substrate including a first surface, a second surface on an opposite side of the first surface, a first layer between the first surface and the second surface, and a second layer between the first layer and the second surface, and a plurality of pixel circuits formed in the substrate. Each of the plurality of pixel circuits includes a first photoelectric conversion element, a second photoelectric conversion element, a first transfer gate configured to transfer signal charges from the first photoelectric conversion element, and a second transfer gate configured to transfer signal charges from the second photoelectric conversion element. The first photoelectric conversion element includes a first impurity region located in the first layer and configured to generate signal charges corresponding to incident light, and a second impurity region located in the second layer and configured to transport the signal charges generated in the first impurity region toward the first transfer gate. The second photoelectric conversion element includes a third impurity region located in the first layer and configured to generate signal charges corresponding to incident light, and a fourth impurity region located in the second layer and configured to transport the signal charges generated in the third impurity region toward the second transfer gate. The first layer further includes a first separation region located between the first impurity region and the third impurity region. The second layer further includes a second separation region located between the second impurity region and the fourth impurity region. In at least one pixel of the plurality of pixel circuits, the first separation region and the second separation region extend in directions different from each other in a planar view with respect to the first surface, the second impurity region includes a first portion overlapping the first separation region in the planar view with respect to the first surface, a second portion adjacent to the first transfer gate, and a third portion located on an opposite side of the second portion with respect to the first portion, and the second impurity region has a potential distribution monotonically decreasing from the third portion to the second portion for signal charges.

Further features of the present invention will become apparent from the following description of exemplary embodiments with reference to the attached drawings.

BRIEF DESCRIPTION OF THE DRAWINGS

FIGS. 13A to 13C are views for explaining other embodiments.

DESCRIPTION OF THE EMBODIMENTS

Figure 1:
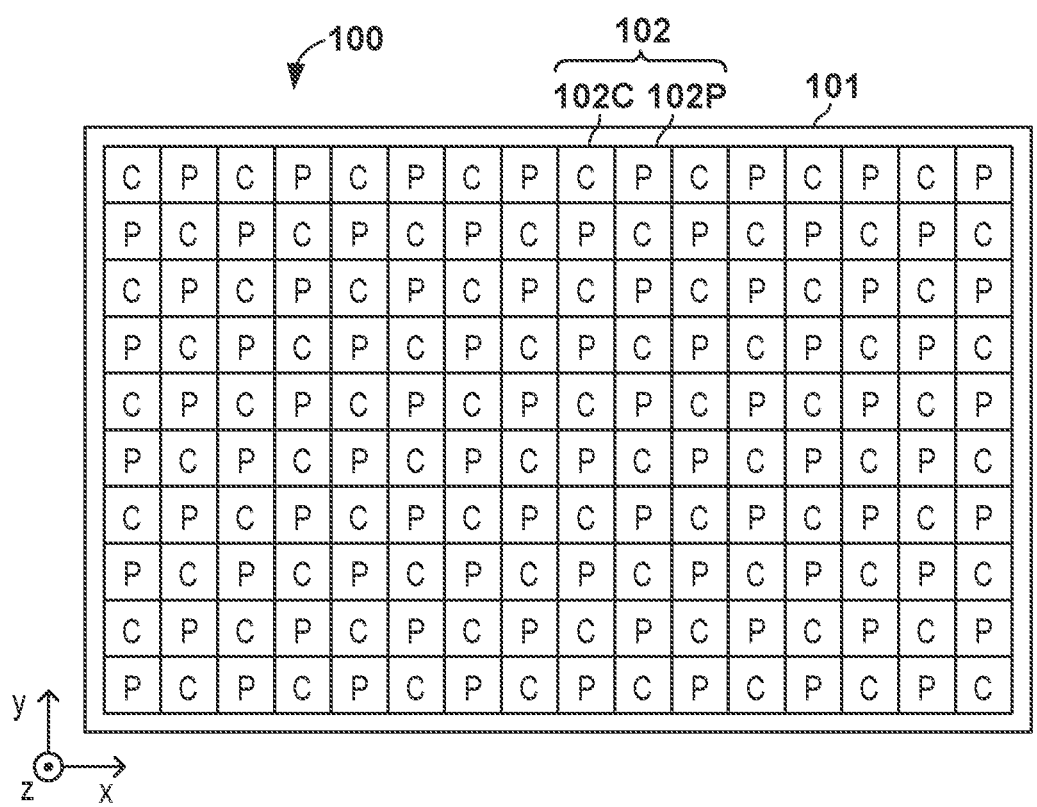
FIG. 1 is a view for explaining an arrangement example of a photoelectric conversion device according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

With reference to FIGS. 1 to 7B, a photoelectric conversion device 100 according to a first embodiment will be described. FIG. 1 is a schematic top view of the photoelectric conversion device 100. The photoelectric conversion device 100 includes a substrate 101, and a plurality of pixel circuits 102 formed in the substrate 101. The plurality of pixel circuits 102 are arranged in a two-dimensional array. Alternatively, the plurality of pixel circuits 102 may be arranged one-dimensionally.

The plurality of pixel circuits 102 are classified into two types including a parallel pixel circuit 102P and a cross pixel circuit 102C. The parallel pixel circuit 102P is the pixel circuit 102 in which impurity regions in two layers, which form two photoelectric conversion elements, are arranged in the same direction, as will be described later in detail. The parallel pixel circuit 102P is indicated by a letter "P" in FIG. 1. The cross pixel circuit 102C is the pixel circuit 102 in which impurity regions in two layers, which form two photoelectric conversion elements, are arranged in directions crossing each other, as will be described later in detail. The cross pixel circuit 102C is indicated by a letter "C" in FIG. 1. In the example shown in FIG. 1, the parallel pixel circuit 102P and the cross pixel circuit 102C are alternately arranged. Alternatively, the parallel pixel circuit 102P and the cross pixel circuit 102C may be arranged in another pattern. Further, the photoelectric conversion device 100 may include only the cross pixel circuits 102C and no parallel pixel circuit 102P.

Figure 2:
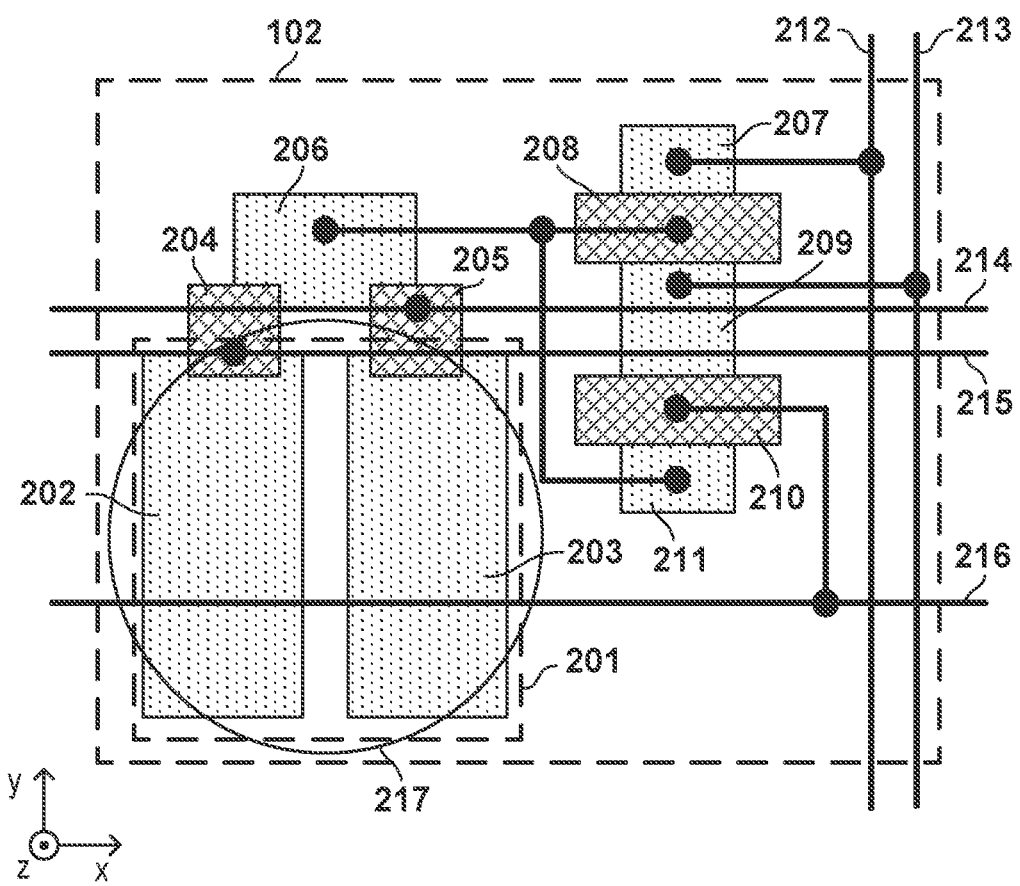
FIG. 2 is a view for explaining an arrangement example of a pixel circuit according to the first embodiment.

With reference to FIG. 2, an arrangement example of the pixel circuit 102 will be described. A description of the pixel circuit 102 applies to both the parallel pixel circuit 102P and the cross pixel circuit 102C. The pixel circuit 102 includes two photoelectric conversion elements 202 and 203, four gate electrodes 204, 205, 208, and 210, four impurity regions 206, 207, 209, and 211, and one microlens 217. The two photoelectric conversion elements 202 and 203 are formed in a conversion element arrangement region 201 of the pixel circuit 102. The two photoelectric conversion elements 202 and 203 individually generate signal charges corresponding to incident light.

The impurity region 206 functions as a floating diffusion. The gate electrode 204 is arranged adjacent to each of the photoelectric conversion element 202 and the impurity region 206. The gate electrode 204 functions as the transfer gate of a transfer transistor used to transfer signal charges generated by the photoelectric conversion element 202 to the impurity region 206. A control signal is supplied from a vertical scanning circuit (not shown) of the photoelectric conversion device 100 to the gate electrode 204 via a driving line 215. The gate electrode 205 is arranged adjacent to each of the photoelectric conversion element 203 and the impurity region 206. The gate electrode 205 functions as the transfer gate of a transfer transistor used to transfer signal charges generated by the photoelectric conversion element 203 to the impurity region 206. A control signal is supplied from the vertical scanning circuit (not shown) of the photoelectric conversion device 100 to the gate electrode 205 via a driving line 214.

The impurity region 206 is electrically connected to each of the gate electrode 208 and the impurity region 211. A predetermined voltage is supplied from a power supply circuit (not shown) of the photoelectric conversion device 100 to the impurity region 209 via a power supply line 213. The gate electrode 210 functions as the gate of a reset transistor used to reset the potential of the floating diffusion (impurity region 206). A control signal is supplied from the vertical scanning circuit (not shown) of the photoelectric conversion device 100 to the gate electrode 210 via a driving line 216.

The impurity region 207 is electrically connected to a signal line 212. The gate electrode 208 functions as the gate of an amplification transistor used to amplify and read out a signal corresponding to the potential of the floating diffusion (impurity region 206). Therefore, signals corresponding to signal charges generated by the two photoelectric conversion elements 202 and 203, respectively, are individually read out to a readout circuit (not shown) of the photoelectric conversion device 100 via the signal line 212.

Regardless of whether it is the parallel pixel circuit 102P or the cross pixel circuit 102C, the plurality of pixel circuits 102 have the same structure except for the conversion element arrangement region 201. More specifically, the gate electrodes 204 of the plurality of pixel circuits 102 are arranged in the same direction (the positive direction of the y-axis in the coordinate system shown in FIG. 2) with respect to the photoelectric conversion element 202 (more specifically, an impurity region 303 thereof). Similarly, the gate electrodes 205 are arranged in the same direction (the positive direction of the y-axis in the coordinate system shown in FIG. 2) with respect to the photoelectric conversion element 203 (more specifically, an impurity region 304 thereof). Further, conductive patterns in the pixel circuits 102 have the same structure regardless of whether it is the parallel pixel circuit 102P or the cross pixel circuit 102C. In this manner, when the pixel circuits 102 have the same structure except for the conversion element arrangement region 201, for example, it is possible to suppress a difference in pixel characteristics caused by a difference in capacitance of the floating diffusion.

With reference to FIGS. 3A to 3F, the structure of the parallel pixel circuit 102P will be described in detail. The conversion element arrangement region 201 included in the parallel pixel circuit 102P is referred to as a conversion element arrangement region 201P. As has been described above, in this embodiment, the parallel pixel circuit 102P and the cross pixel circuit 102C are different only in the structure of the conversion element arrangement region 201. Therefore, hereinafter, the structure of the conversion element arrangement region 201P will be described in detail.

Figure 3A:
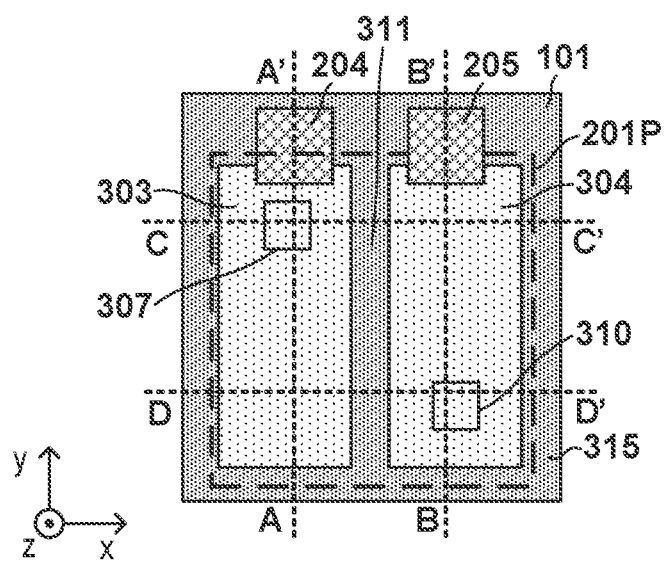
FIGS. 3A to 3F are views for explaining an arrangement example of a parallel pixel circuit according to the first embodiment.
Figure 3B:
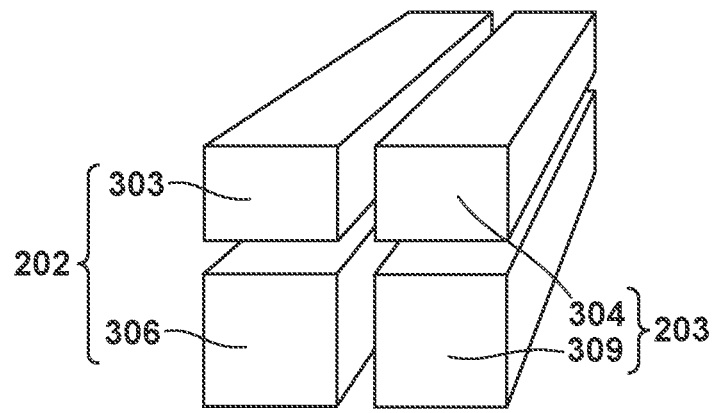
Figure 3C:
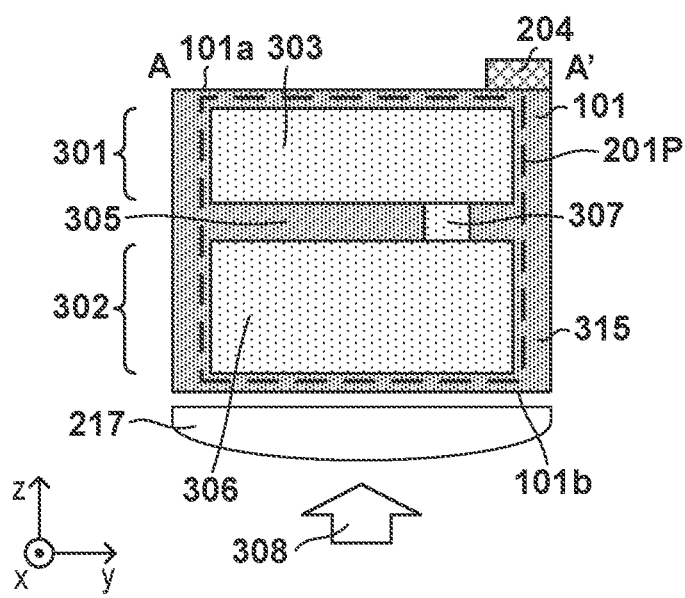
Figure 3D:
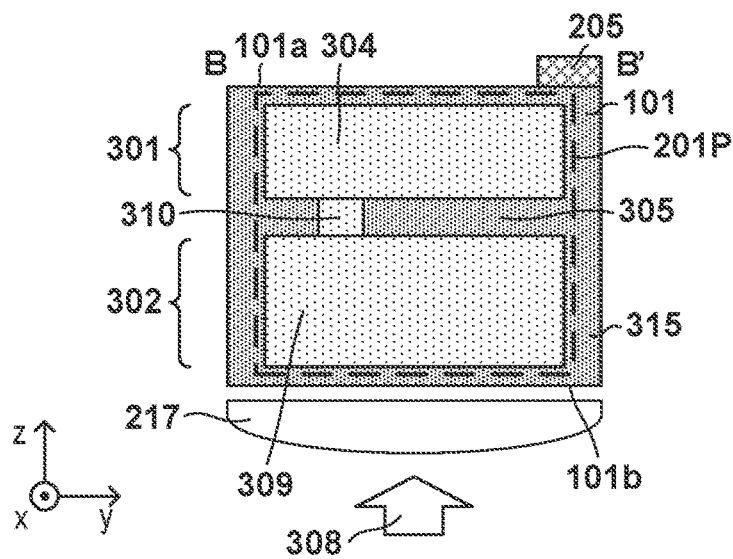
Figure 3E:
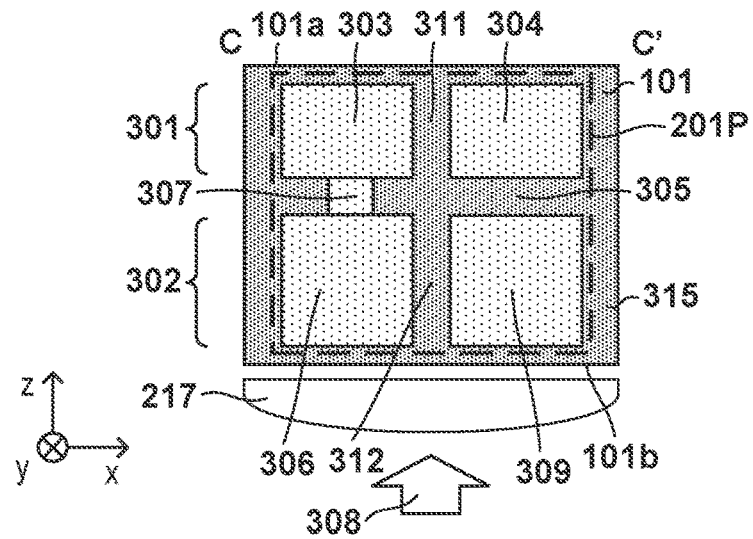
Figure 3F:
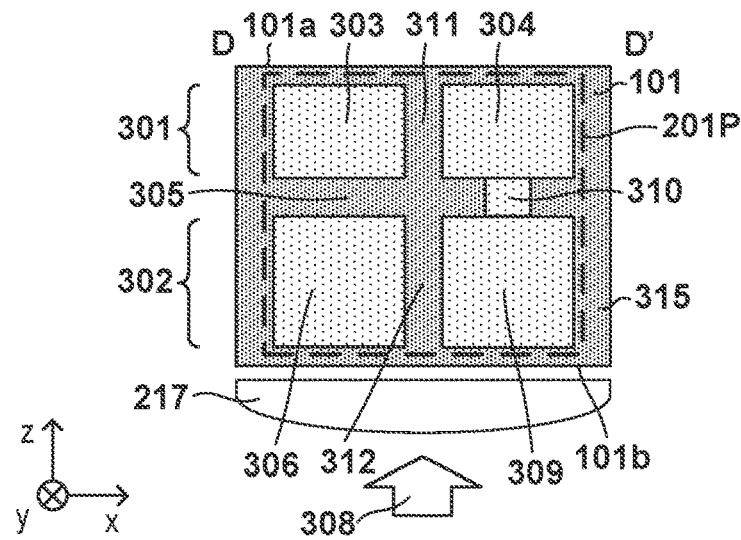

FIG. 3A is a top view of the conversion element arrangement region 201P. FIG. 3B is a perspective view for explaining the positional relationship among four impurity regions 303, 304, 306, and 309 of the parallel pixel circuit 102P. FIG. 3C is a sectional view of the conversion element arrangement region 201P taken along a line A-A' in FIG. 3A. FIG. 3D is a sectional view of the conversion element arrangement region 201P taken along a line B-B' in FIG. 3A. FIG. 3E is a sectional view of the conversion element arrangement region 201P taken along a line C-C' in FIG. 3A. FIG. 3F is a sectional view of the conversion element arrangement region 201P taken along a line D-D' in FIG. 3A.

The photoelectric conversion elements 202 and 203 are formed in the substrate 101. The substrate 101 is, for example, a semiconductor substrate (a silicon substrate or the like). The substrate 101 includes an upper surface 101a and a lower surface 101b on the opposite side of the upper surface 101a. In this embodiment, the photoelectric conversion device 100 is a back-side illumination type photoelectric conversion device. The microlens 217 is formed on the lower surface 101b side of the substrate 101, and a wiring structure is formed on the upper surface 101a side of the substrate 101. Incident light 308 to the photoelectric conversion device 100 passes through the microlens 217, and then enters the photoelectric conversion elements 202 and 203 from the lower surface 101b. Accordingly, the lower surface 101b can also be referred to as an incident surface.

The photoelectric conversion elements 202 and 203 are formed over two layers 301 and 302 of the substrate 101. Both the layers 301 and 302 are located between the upper surface 101a and the lower surface 101b. The layer 302 is located between the layer 301 and the lower surface 101b. The layer 301 is located between the layer 302 and the upper surface 101a. The layer 302 is closer to the incident surface (lower surface 101b) than the layer 301.

The photoelectric conversion element 202 includes the impurity region 303 located in the layer 301, the impurity region 306 located in the layer 302, and an impurity region 307 located between the layer 301 and the layer 302. In the impurity region 306, signal charges corresponding to incident light are generated. The signal charges generated in the impurity region 306 are transported to the impurity region 303 via the impurity region 307, and accumulated in the impurity region 303. When an ON voltage is supplied to the gate electrode 204, the signal charges accumulated in the impurity region 303 are transferred to the impurity region 206. In this manner, the impurity region 303 transports the signal charges generated in the impurity region 306 toward the gate electrode 204.

In this embodiment, a case will be described in which the signal charges are electrons. Accordingly, both the impurity regions 303 and 306 are n-type impurity regions. When the signal charges are holes, the conductivity type of each impurity region in this specification is reversed.

The photoelectric conversion element 203 includes the impurity region 304 located in the layer 301, the impurity region 309 located in the layer 302, and an impurity region 310 located between the layer 301 and the layer 302. In the impurity region 309, signal charges corresponding to incident light are generated. The signal charges generated in the impurity region 309 are transported to the impurity region 304 via the impurity region 310, and accumulated in the impurity region 304. When an ON voltage is supplied to the gate electrode 205, the signal charges accumulated in the impurity region 304 are transferred to the impurity region 206. In this manner, the impurity region 304 transports the signal charges generated in the impurity region 309 toward the gate electrode 205. Since the signal charges are electrons, both the impurity regions 304 and 309 are n-type impurity regions.

The impurity region 303 and the impurity region 304 are separated from each other by an impurity region 311 located in the layer 301. The impurity region 311 functions as a separation region that separates the impurity region 303 and the impurity region 304. The impurity region 311 is located between the impurity region 303 and the impurity region 304, and extends in the y-axis direction in a planar view with respect to the upper surface 101a. Since the upper surface 101a and the lower surface 101b are substantially parallel to each other, a planar view with respect to the upper surface 101a is also a planar view with respect to the lower surface 101b. The impurity region 311 may be a p-type impurity region, or may be an n-type impurity region having a lower concentration than the impurity regions 303 and 304.

The impurity region 306 and the impurity region 309 are separated from each other by an impurity region 312 located in the layer 302. The impurity region 312 functions as a separation region that separates the impurity region 306 and the impurity region 309. The impurity region 312 is located between the impurity region 306 and the impurity region 309, and extends in the y-axis direction in the planar view with respect to the upper surface 101a. The impurity region 312 is a p-type impurity region. In this manner, in the parallel pixel circuit 102P, the impurity region 311 and the impurity region 312 extend in the same direction (y-axis direction) in the planar view with respect to the upper surface 101a. In other words, in the parallel pixel circuit 102P, the direction in which the two impurity regions 303 and 304 are adjacent in the layer 301 and the direction in which the two impurity regions 306 and 309 are adjacent in the layer 302 are the same direction (both are the x-axis direction).

The two impurity regions 303 and 304 located in the layer 301 and the impurity regions 306 and 309 located in the layer 302 are separated from each other by an impurity region 305 except for portions where the impurity regions 307 and 310 are arranged. The impurity region 305 functions as a separation region that separates the layer 301 and the layer 302. The impurity region 305 is located between the impurity region 303 and the impurity region 306 and between the impurity region 304 and the impurity region 309. The impurity region 305 is a p-type impurity region. The impurity region 307 has a potential gradient that allows transport of signal charges from the impurity region 306 to the impurity region 303. This potential gradient may monotonically change. The impurity region 307 may be an n-type impurity region, or may be a p-type impurity region having a lower impurity concentration than the impurity region 305. The above description of the impurity region 307 also applies to the impurity region 310.

Since the impurity regions 305, 307, and 310 are arranged between the layer 301 and the layer 302, the signal charges generated in the impurity region 306 are transported not to the impurity region 304 but to the impurity region 303. Further, the signal charges generated in the impurity region 309 are transported not to the impurity region 303 but to the impurity region 304.

An impurity region 315 is arranged on the side of the conversion element arrangement region 201P. The impurity region 315 separates the conversion element arrangement regions 201 of the two adjacent pixel circuits 102 from each other. The impurity region 315 is a p-type impurity region.

With reference to FIGS. 4A to 4F, the structure of the cross pixel circuit 102C will be described in detail. The conversion element arrangement region 201 included in the cross pixel circuit 102C is referred to as a conversion element arrangement region 201C. As has been described above, in this embodiment, the cross pixel circuit 102C and the parallel pixel circuit 102P are different only in the structure of the conversion element arrangement region 201. Therefore, hereinafter, the structure of the conversion element arrangement region 201C will be described in detail.

Figure 4A:
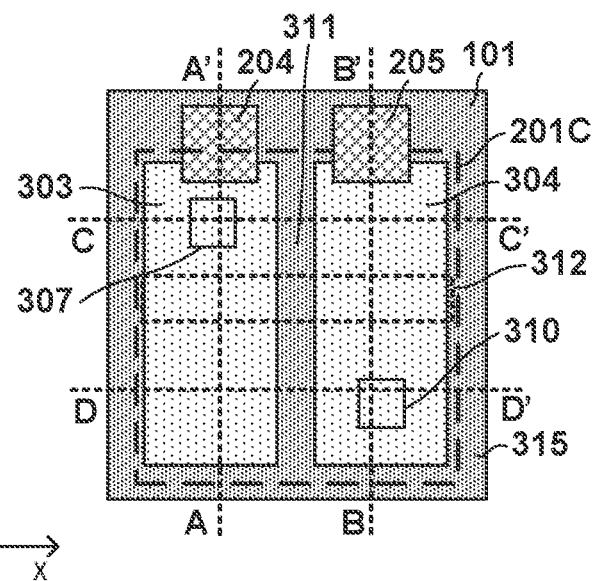
FIGS. 4A to 4F are views for explaining an arrangement example of a cross pixel circuit according to the first embodiment.
Figure 4B:
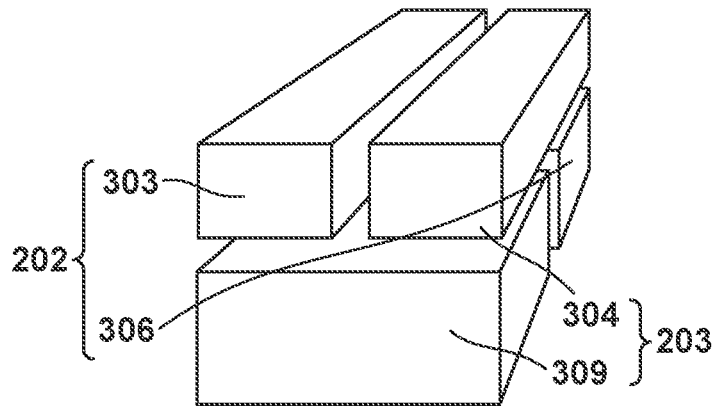
Figure 4C:
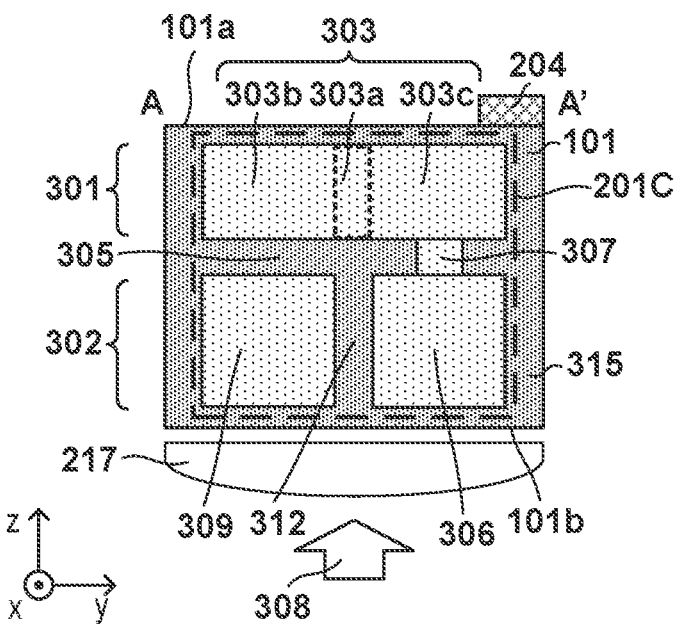
Figure 4D:
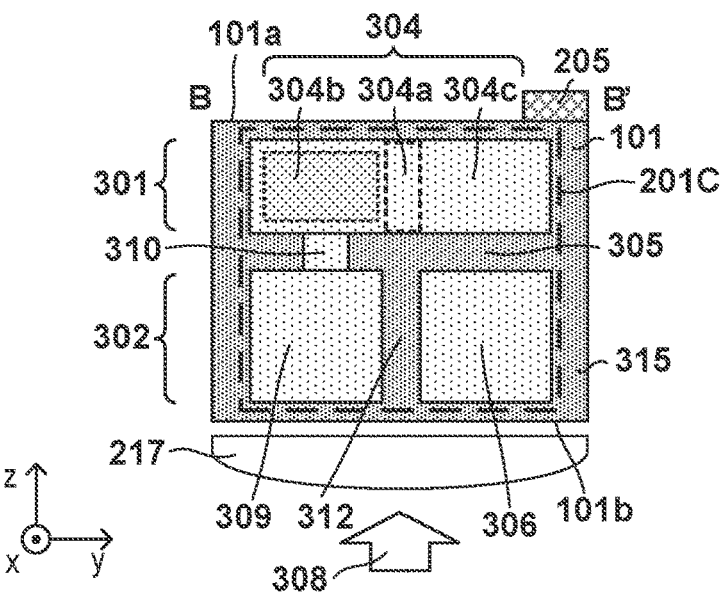
Figure 4E:
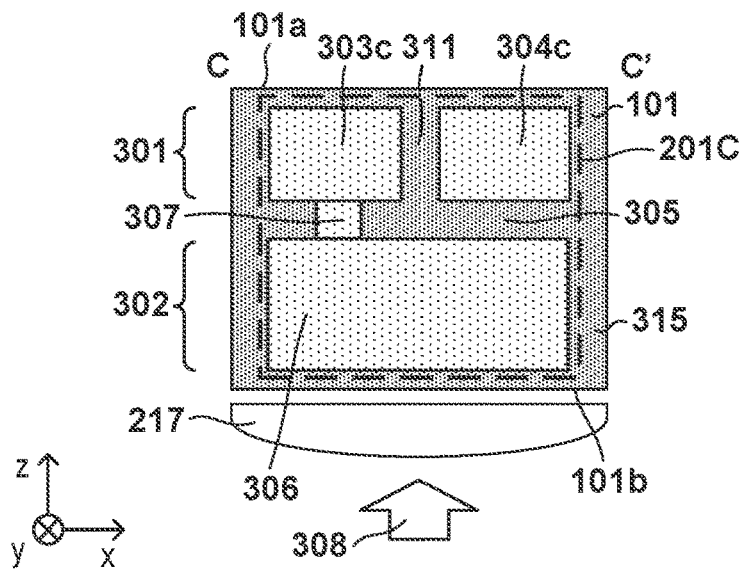
Figure 4F:
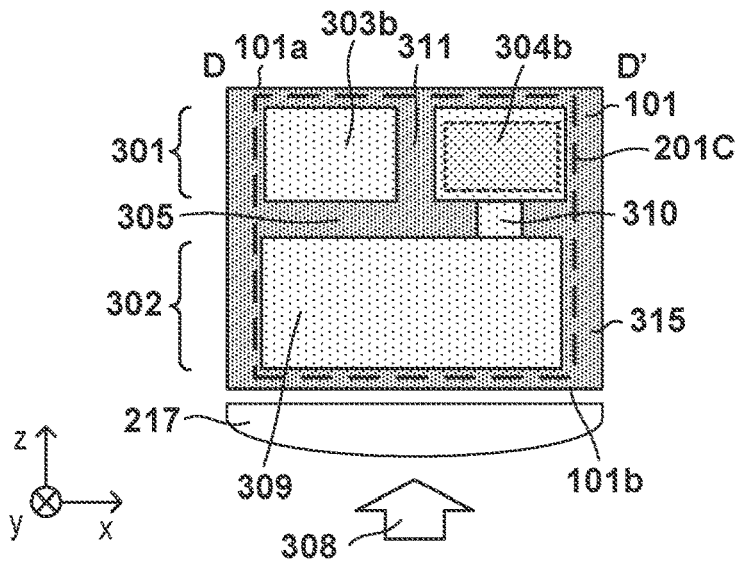

FIG. 4A is a top view of the conversion element arrangement region 201C. FIG. 4B is a perspective view for explaining the positional relationship among four impurity regions 303, 304, 306, and 309 of the cross pixel circuit 102C. FIG. 4C is a sectional view of the conversion element arrangement region 201C taken along a line A-A' in FIG. 4A. FIG. 4D is a sectional view of the conversion element arrangement region 201C taken along a line B-B' in FIG. 4A. FIG. 4E is a sectional view of the conversion element arrangement region 201C taken along a line C-C' in FIG. 4A. FIG. 4F is a sectional view of the conversion element arrangement region 201C taken along a line D-D' in FIG. 4A.

The conversion element arrangement region 201C is different from the conversion element arrangement region 201P in that the impurity region 312 extends in the x-axis direction in the planar view with respect to the upper surface 101a. Further, in the conversion element arrangement region 201C, a portion 313 of the impurity region 304 includes a p-type impurity (for example, boron; the same applies hereinafter). Otherwise, the conversion element arrangement region 201C may be similar to the conversion element arrangement region 201P.

In the cross pixel circuit 102C, the impurity region 311 and the impurity region 312 extend in directions different from each other in the planar view with respect to the upper surface 101a. More specifically, in the planar view with respect to the upper surface 101a, the impurity region 311 extends in the y-axis direction, and the impurity region 312 extends in the x-axis direction. In other words, in the cross pixel circuit 102C, the direction in which the two impurity regions 303 and 304 are adjacent in the layer 301 is different from the direction in which the two impurity regions 306 and 309 are adjacent in the layer 302. In the example shown in FIG. 4A, the impurity region 311 and the impurity region 312 respectively extend in directions orthogonal to each other, but they may extend so as to cross at another angle.

The impurity region 305 is located between the impurity region 303 and 306, between the impurity region 303 and the impurity region 309, between the impurity region 304 and the impurity region 306, and between the impurity region 304 and the impurity region 309.

The impurity region 304 includes a portion 304a that overlaps the impurity region 312 in the planar view with respect to the upper surface 101a, a portion 304c adjacent to the gate electrode 205, and a portion 304b located on the opposite side of the portion 304c with respect to the portion 304a. The portion 304b and the portion 304c are on opposite sides of the portion 304a. The portion 304b is farther from the gate electrode 205 than the portion 304a. The portion 304c is closer to the gate electrode 205 than the portion 304a. In the photoelectric conversion element 203, the portion 304b of the impurity region 304 is coupled to the impurity region 310. Therefore, signal charges generated in the impurity region 309 are transported to the portion 304b of the impurity region 304, and then transported toward the gate electrode 205 through the portions 304a and 304c of the impurity region 304.

The concentration of the impurity of the conductivity type (p-type in this embodiment) opposite to the conductivity type of signal charges is higher in the portion 304b of the impurity region 304 than in the portion 304c of the impurity region 304. As will be described later in detail, with the concentration distribution as described above, a signal charge transport path in the impurity region 304 has a potential distribution that monotonically changes so as to transport signal charges from the portion 304b to the portion 304c.

The impurity region 303 includes a portion 303a that overlaps the impurity region 312 in the planar view with respect to the upper surface 101a, a portion 303c adjacent to the gate electrode 204, and a portion 303b located on the opposite side of the portion 303c with respect to the portion 303a. The portion 303b and the portion 303c are on opposite sides of the portion 303a. The portion 303b is farther from the gate electrode 204 than the portion 303a. The portion 303c is closer to the gate electrode 204 than the portion 303a. In the photoelectric conversion element 202, the portion 303c of the impurity region 303 is coupled to the impurity region 307. Therefore, signal charges generated in the impurity region 306 are transported to the portion 303c of the impurity region 303, and then transported toward the gate electrode 204.

As has been described above, in the parallel pixel circuit 102P, the two impurity regions 306 and 309, where signal charges corresponding to incident light are generated, are adjacent in the x-axis direction. On the other hand, in the cross pixel circuit 102C, the two impurity regions 306 and 309, where signal charges corresponding to incident light are generated, are adjacent in the y-axis direction. Therefore, image plane phase difference AF can be performed in two different directions by using the photoelectric conversion device 100. In this embodiment, the impurity regions 306 and 309 are adjacent in two different directions in the plurality of pixel circuits 102. Alternatively, the impurity regions 306 and 309 may be adjacent in three or more different directions in the plurality of pixel circuits 102.

Figure 5A:
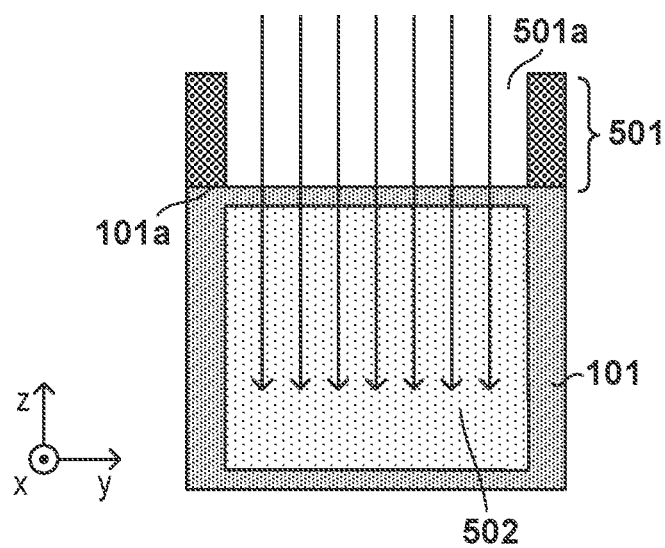
FIGS. 5A to 5F are views for explaining an example of a manufacturing method of the photoelectric conversion device according to the first embodiment.
Figure 5B:
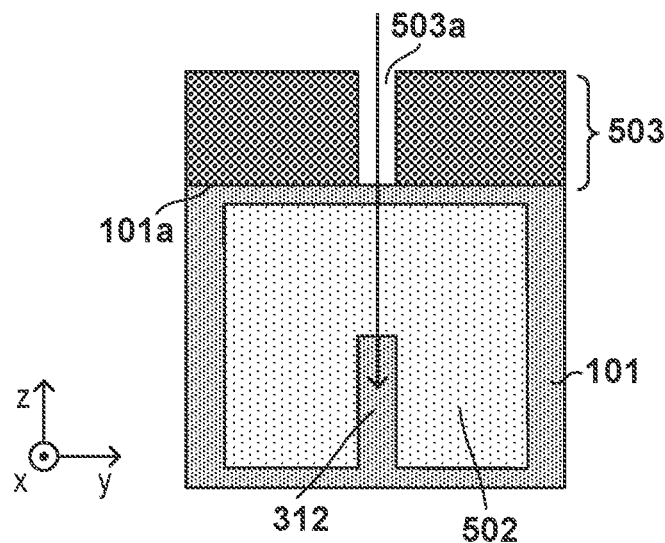
Figure 5C:
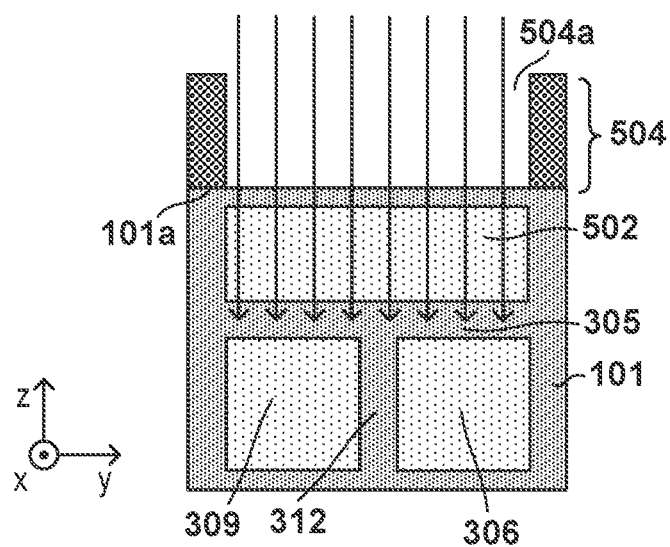
Figure 5D:
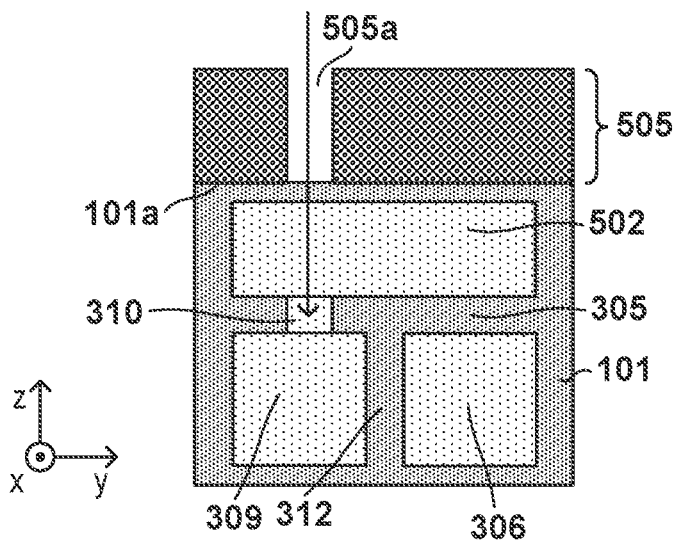
Figure 5E:
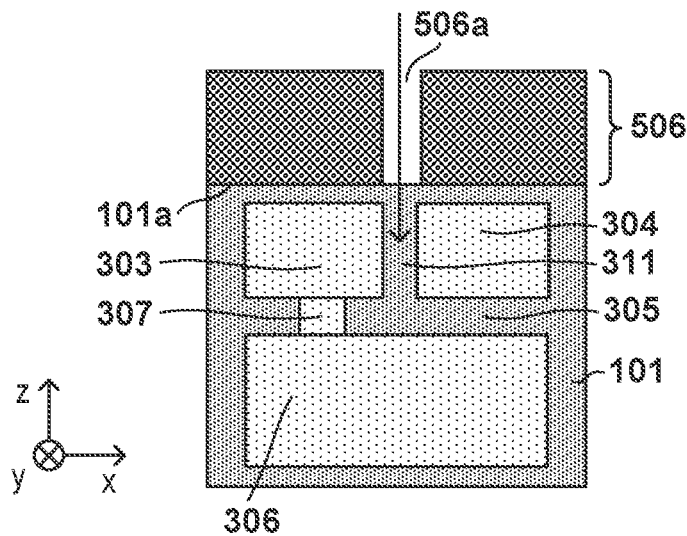

With reference to FIGS. 5A to 5F, a manufacturing method of the photoelectric conversion device 100 will be described. Since the manufacturing method may be similar to an existing technique except for the conversion element arrangement region 201, the manufacturing method of the conversion element arrangement region 201 will mainly be described below. Each of FIGS. 5A to 5D and 5F shows a sectional view of the substrate 101 halfway through the manufacturing of the photoelectric conversion device 100 at a position corresponding to the sectional view of FIG. 4C. FIG. 5E shows a sectional view of the substrate 101 halfway through the manufacturing of the photoelectric conversion device 100 at a position corresponding to the sectional view of FIG. 4D.

As shown in FIG. 5A, a resist pattern 501 is formed on the upper surface 101a of the substrate 101. In the resist pattern 501, an opening 501a is formed for each region where the pixel circuit 102 is to be formed. The resist pattern 501 exposes, from the opening 501a, a region where the conversion element arrangement region 201 is to be formed, and covers the remaining portion of the substrate 101. An n-type impurity (for example, phosphorus; the same applies hereinafter) is doped to the substrate 101 through the opening 501a using the resist pattern 501. With this, an n-type impurity region 502 is formed in the substrate 101. Before this step, each of the region of the substrate 101 where the conversion element arrangement region 201 is to be formed and a region around it is a p-type semiconductor region. Parts of the impurity region 502 become the impurity regions 303, 304, 306, and 309 of the pixel circuit 102.

Then, as shown in FIG. 5B, a resist pattern 503 is formed on the upper surface 101a of the substrate 101. In the resist pattern 503, an opening 503a is formed for each region where the pixel circuit 102 is to be formed. The resist pattern 503 exposes, from the opening 503a, a region where the impurity region 312 is to be formed, and covers the remaining portion of the substrate 101. In the planar view with respect to the upper surface 101a, the opening 503a formed in a region where the parallel pixel circuit 102P is to be formed extends in the y-axis direction, and the opening 503a formed in a region where the cross pixel circuit 102C is to be formed extends in the x-axis direction. A p-type impurity is doped to the substrate 101 through the opening 503a using the resist pattern 503. With this, a part of the impurity region 502 is changed to the p-type impurity region 312. The impurity region 312 separates the impurity region 306 and the impurity region 309 located in the layer 302 in the photoelectric conversion device 100. Therefore, in this step, the p-type impurity is doped to a deep position (a position corresponding to the layer 302 of the conversion element arrangement region 201) in the substrate 101. The p-type impurity may be doped down to the lower surface 101b of the substrate 101. The p-type impurity may be doped in multiple stages.

Then, as shown in FIG. 5C, a resist pattern 504 is formed on the upper surface 101a of the substrate 101. In the resist pattern 504, an opening 504a is formed for each region where the pixel circuit 102 is to be formed. The resist pattern 504 exposes, from the opening 504a, a region where the impurity region 305 is to be formed, and covers the remaining portion of the substrate 101. A p-type impurity is doped to the substrate 101 through the opening 504a using the resist pattern 504. With this, a part of the impurity region 502 is changed to the p-type impurity region 305. The impurity region 305 vertically divides the impurity region 502. In this step, the p-type impurity is doped to a middle position in the substrate 101. A portion of the impurity region 502 located below the impurity region 305 is already divided by the impurity region 312. Therefore, two portions of the impurity region 502 located below the impurity region 305 become the impurity region 306 and the impurity region 309. The concentration of the p-type impurity for forming the impurity region 305 may be higher than the concentration of the p-type impurity for forming the impurity region 312 in the step shown in FIG. 5B.

Then, as shown in FIG. 5D, a resist pattern 505 is formed on the upper surface 101a of the substrate 101. In the resist pattern 505, two openings 505a are formed for each region where the pixel circuit 102 is to be formed. The resist pattern 505 exposes, from the openings 505a, regions where the impurity regions 307 and 310 are to be formed, and covers the remaining portion of the substrate 101. An n-type impurity is doped to the substrate 101 through the openings 505a using the resist pattern 505. With this, parts of the impurity region 305 are changed to the n-type impurity regions 307 and 310. In the sectional view of FIG. 5D, the impurity region 310 is shown but the impurity region 307 is not shown.

Then, as shown in FIG. 5E, a resist pattern 506 is formed on the upper surface 101a of the substrate 101. In the resist pattern 506, an opening 506a is formed for each region where the pixel circuit 102 is to be formed. The resist pattern 506 exposes, from the opening 506a, a region where the impurity region 311 is to be formed, and covers the remaining portion of the substrate 101. In the planar view with respect to the upper surface 101a, both of the opening 503a formed in the region where the parallel pixel circuit 102P is to be formed and the opening 503a formed in the region where the cross pixel circuit 102C is to be formed extend in the y-axis direction. An p-type impurity is doped to the substrate 101 through the opening 506a using the resist pattern 506. With this, a part of the impurity region 502 is changed to the n-type impurity region 311. With this step, the impurity region 502 is divided into the impurity region 303 and the impurity region 304. In this step, the p-type impurity is doped to a shallow position (a position corresponding to the layer 301 of the conversion element arrangement region 201) in the substrate 101.

Figure 5F:
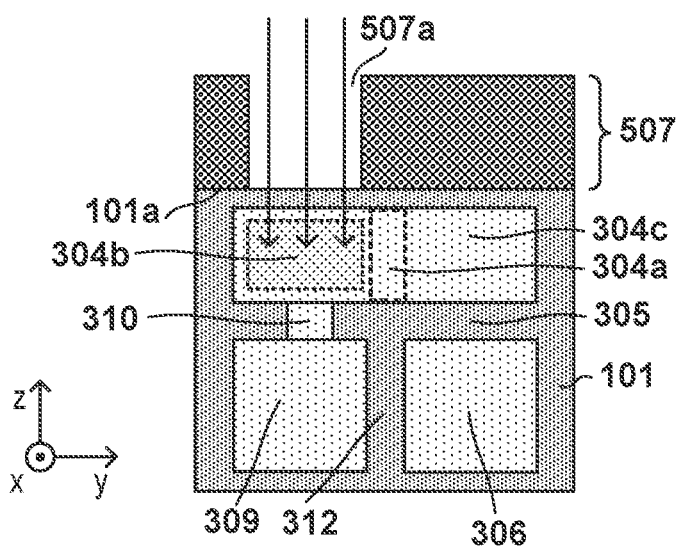

Then, as shown in FIG. 5F, a resist pattern 507 is formed on the upper surface 101a of the substrate 101. In the resist pattern 507, an opening 507a is formed for each region where the pixel circuit 102 is to be formed. The resist pattern 507 exposes, from the opening 507a, a part (a part corresponding to the portion 304b) of the impurity region 304, and covers the remaining part of the substrate 101. A p-type impurity is doped to the substrate 101 through the opening 507a using the resist pattern 507. With this, the concentration of the p-type impurity in the portion 304b of the impurity region 304 increases. The concentration of the p-type impurity doped to the portion 304b of the impurity region 304 may be similar to the concentration of the p-type impurity for forming the impurity region 312 in the step shown in FIG. 5B.

Figure 6:
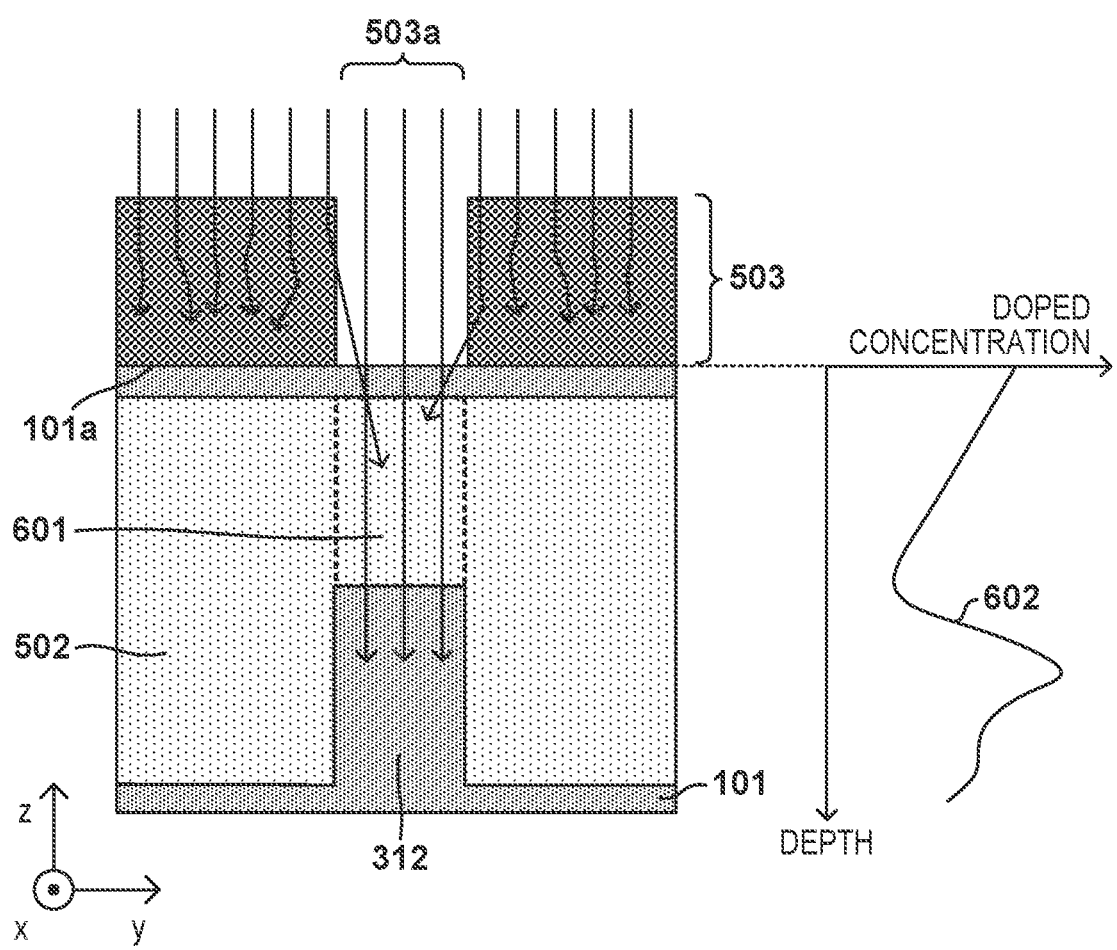
FIG. 6 is a view for explaining the example of the manufacturing method of the photoelectric conversion device according to the first embodiment.

With reference to FIG. 6, the step shown in FIG. 5B will be described in detail. The p-type impurity doped toward the opening 503a of the resist pattern 503 reaches the deep position in the substrate 101, and forms the impurity region 312. On the other hand, the p-type impurity doped to the resist pattern 503 ideally does not reach the substrate 101. However, a part of the p-type impurity doped near the opening 503a of the resist pattern 503 turns its direction by colliding with the resist material, projects from the side surface of the opening 503a, and reaches the substrate 101. Since such the p-type impurity has consumed energy in the resist pattern 503, it is doped to a shallow position (a region 601 above the impurity region 312) in the substrate 101. As shown in a graph 602 on the right side in FIG. 6, the closer to the upper surface 101a of the substrate 101, the higher the concentration of the p-type impurity doped to the region 601.

Figure 7A:
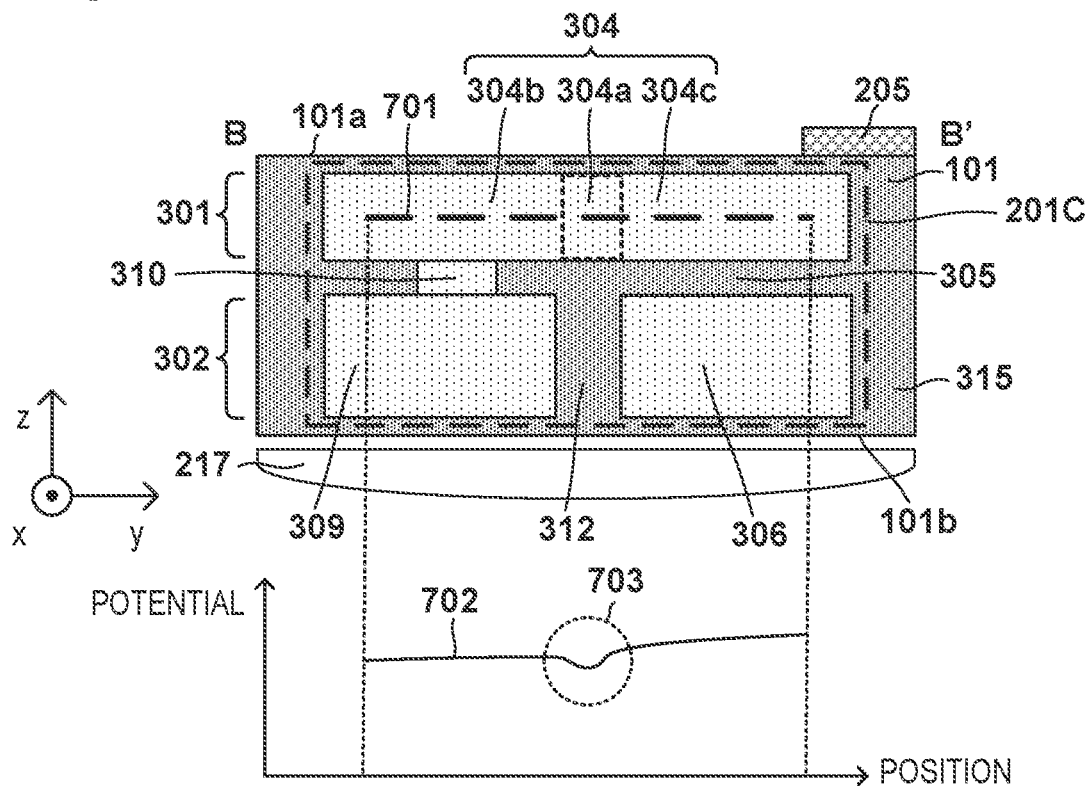
FIGS. 7A and 7B are views or explaining an example of the potential distribution of the photoelectric conversion device according to the first embodiment.
Figure 7B:
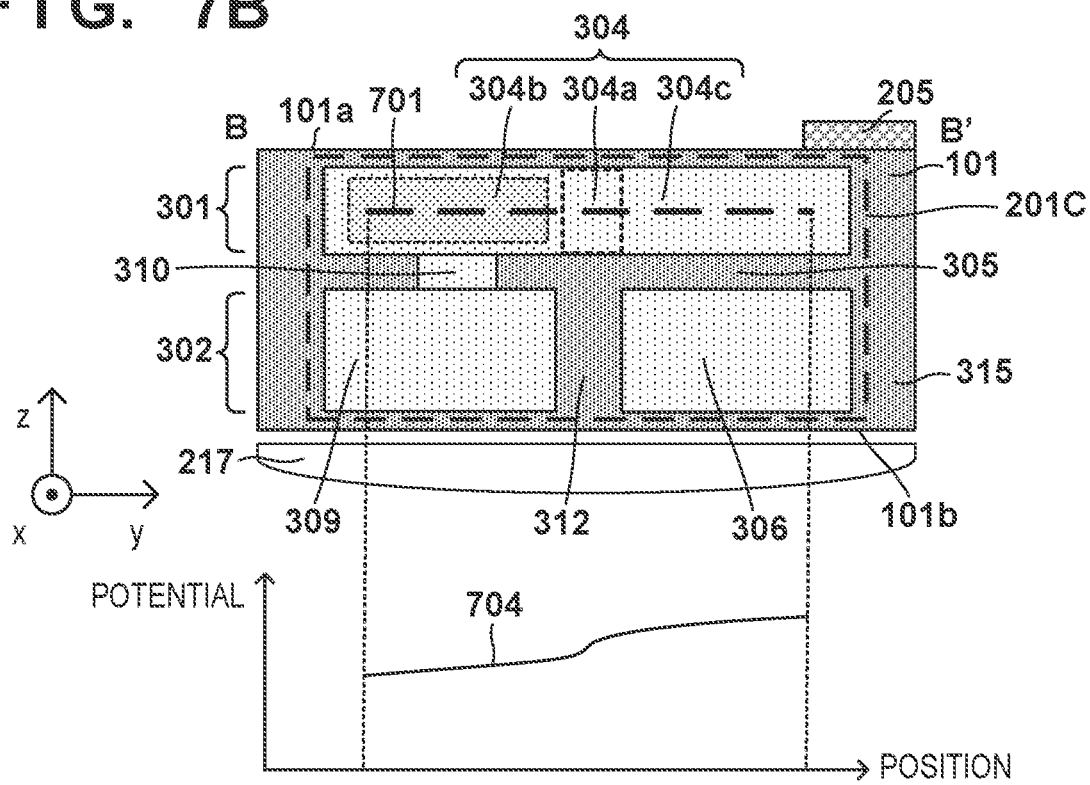

With reference to FIGS. 7A and 7B, an influence of the p-type impurity doped also to the shallow position in the substrate 101 during formation of the impurity region 312, and a method of reducing the influence will be described. FIG. 7A describes a photoelectric conversion device according to a comparative example. The photoelectric conversion device according to the comparative example is manufactured without performing the step shown in FIG. 5F. FIG. 7A shows a sectional view of the photoelectric conversion device at a position corresponding to FIG. 4C. A graph 702 in FIG. 7A shows the potential distribution at a position 701 in the impurity region 304. The potential may be the depleted potential. The position 701 is included in the signal charge transport path in the impurity region 304. The position 701 may be, for example, the center of the impurity region 304 in the depth direction (z direction) of the substrate 101.

As has been described above with reference to FIG. 6, when doping the p-type impurity for forming the impurity region 312, the p-type impurity is also doped to the portion 304a of the impurity region 304. Due to this p-type impurity, the potential distribution of the impurity region 304 includes a potential barrier at a position 703 on the graph 702. Due to this potential barrier, in the photoelectric conversion element 203 of the cross pixel circuit 102C, the transport efficiency of signal charges from the impurity region 309 toward the gate electrode 205 decreases. On the other hand, in the photoelectric conversion element 202 of the cross pixel circuit 102C, signal charges are transported from the impurity region 306 to the portion 303c of the impurity region 303 close to the gate electrode 204. Hence, the photoelectric conversion element 202 of the cross pixel circuit 102C is not influenced by the p-type impurity doped to the portion 303a of the impurity region 303 during formation of the impurity region 312. Therefore, the signal charge transport efficiency differs between the photoelectric conversion element 202 and the photoelectric conversion element 203 of the cross pixel circuit 102C. On the other hand, in the parallel pixel circuit 102P, since the impurity regions 303 and 304 do not overlap the impurity region 312 in the planar view with respect to the upper surface 101a, a decrease in signal charge transport efficiency as described above does not occur.

FIG. 7B describes the photoelectric conversion device 100 of this embodiment. FIG. 7B shows a sectional view of the photoelectric conversion device 100 at a position corresponding to FIG. 4C. A graph 704 in FIG. 7B shows the potential distribution at the position 701 in the impurity region 304. The potential may be the depleted potential. The position 701 is included in the signal charge transport path in the impurity region 304. The position 701 may be, for example, the center of the impurity region 304 in the depth direction (z direction) of the substrate 101.

The p-type impurity has been doped to the portion 304b of the impurity region 304 in the step shown in FIG. 5F. Therefore, in the portion 304b of the impurity region 304, the concentration of the impurity of the conductivity type (p-type in this embodiment) opposite to the conductivity type of the signal charges is higher than in the portion 304c of the impurity region 304. As a result, as shown in the graph 704, in the potential distribution of the impurity region 304, the signal charge transport path in the impurity region 304 has a potential distribution that monotonically changes so as to transport signal charges from the portion 304b to the portion 304c, and there is no potential barrier. Hence, a decrease in signal charge transport efficiency, which occurs in the above-described comparative example, is suppressed. As a result, a variation in transport efficiency between the photoelectric conversion element 202 and the photoelectric conversion element 203 of the cross pixel circuit 102C decreases. Further, a variation in transport efficiency between the parallel pixel circuit 102P and the cross pixel circuit 102C also decreases.

In the embodiment described above, the p-type impurity is doped only to the portion 304b of the impurity region 304 of the photoelectric conversion element 203 of the cross pixel circuit 102C in the step shown in FIG. 5F. In addition to this, in the step shown in FIG. 5F, the p-type impurity may also be doped to the portion 303b of the impurity region 303 of the photoelectric conversion element 202 of the cross pixel circuit 102C. With this, in the portion 303b of the impurity region 303, the concentration of the impurity of the conductivity type (p-type in this embodiment) opposite to the conductivity type of signal charges becomes higher than in the portion 303c of the impurity region 303. When the impurity region 303 of the photoelectric conversion element 202 has the impurity concentration distribution similar to that in the impurity region 304 of the photoelectric conversion element 203, a variation in signal charge transport characteristic (the maximum amount of transferable charges or the like) between the photoelectric conversion elements decreases. Further, in the step shown in FIG. 5F, the p-type impurity may also be doped to portions of the impurity regions 303 and 304 of the photoelectric conversion elements 202 and 203 of the parallel pixel circuit 102P away from the gate electrodes 204 and 205, respectively. With this, a variation in signal charge transport characteristic (the maximum amount of transferable charges or the like) between the two types of pixel circuits decreases.

In the embodiment described above, a potential pocket may be generated in a portion of the impurity region 304 that overlaps the impurity region 310 in the planar view with respect to the upper surface 101a. To eliminate the potential pocket, a p-type impurity (for example, boron) may be doped to this portion.

Figure 8A:
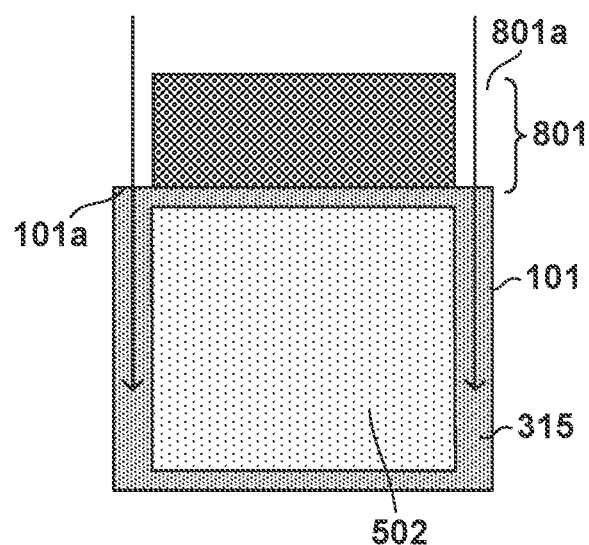
FIGS. 8A to 8E are views for explaining another example of the manufacturing method of the photoelectric conversion device according to the first embodiment.
Figure 8B:
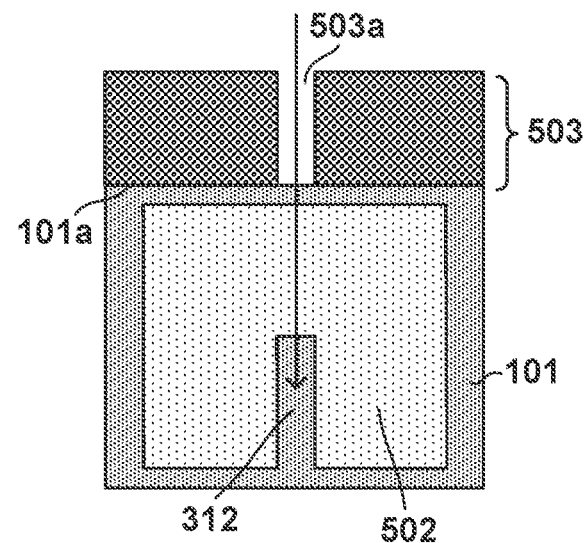
Figure 8C:
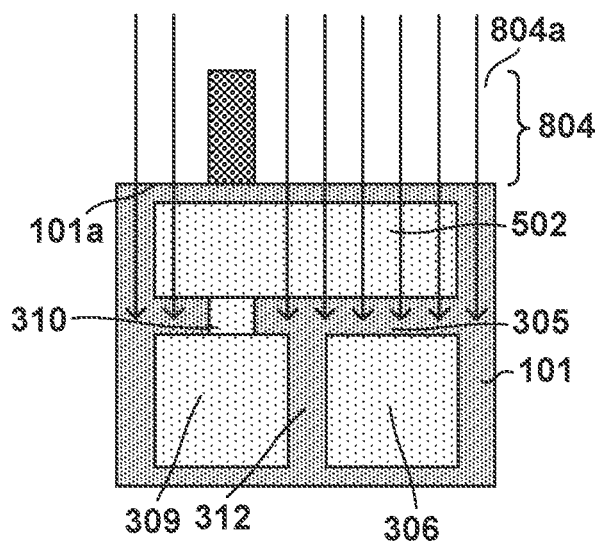
Figure 8D:
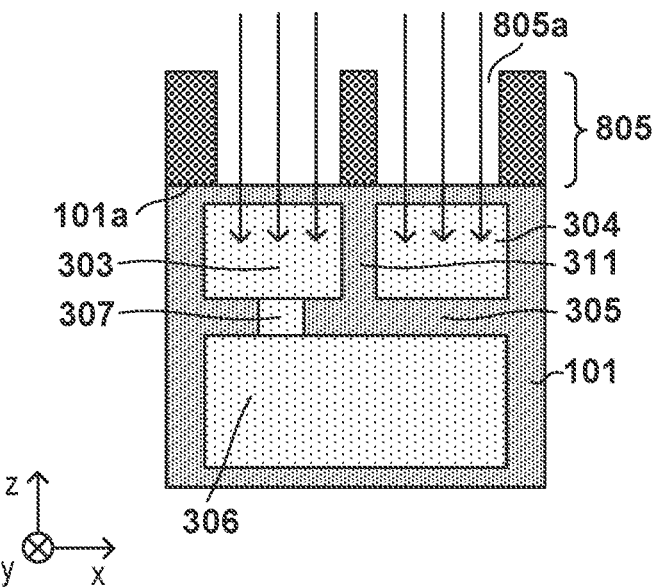

With reference to FIGS. 8A to 8E, another manufacturing method of the photoelectric conversion device 100 will be described. Since the manufacturing method may be similar to an existing technique except for the conversion element arrangement region 201, the manufacturing method of the conversion element arrangement region 201 will mainly be described below. Each of FIGS. 8A to 8C and 8E shows a sectional view of the substrate 101 halfway through the manufacturing of the photoelectric conversion device 100 at a position corresponding to the sectional view of FIG. 4C. FIG. 8D shows a sectional view of the substrate 101 halfway through the manufacturing of the photoelectric conversion device 100 at a position corresponding to the sectional view of FIG. 4D.

As shown in FIG. 8A, a resist pattern 801 is formed on the upper surface 101a of the substrate 101. In the resist pattern 801, an opening 801a is formed so as to correspond to a region where the pixel circuit 102 is to be formed. The resist pattern 801 exposes, from the opening 801a, a portion around the region where the conversion element arrangement region 201 is to be formed, and covers the region where the conversion element arrangement region 201 is to be formed. A p-type impurity is doped to the substrate 101 through the opening 801a using the resist pattern 801. With this, the p-type impurity region 315 is formed in the substrate 101. Before this step, each of the region of the substrate 101 where the conversion element arrangement region 201 is to be formed and the region around it is an n-type semiconductor region. The region of the substrate 101 to which the p-type impurity was not doped remains as the n-type impurity region 502. Parts of the impurity region 502 become the impurity regions 303, 304, 306, 307, and 309 of the pixel circuit 102. Although not shown, a p-type impurity region is formed below the impurity region 502 before formation of the impurity region 315, and a p-type impurity region is formed above the impurity region 502 after formation of the impurity region 315.

Then, as shown in FIG. 8B, as in the step shown in FIG. 5B described above, the resist pattern 503 is formed on the upper surface 101a of the substrate 101, and a p-type impurity is doped to the substrate 101 through the opening 503a using the resist pattern 503. With this, a part of the impurity region 502 is changed to the p-type impurity region 312.

Then, as shown in FIG. 8C, a resist pattern 804 is formed on the upper surface 101a of the substrate 101. In the resist pattern 804, an opening 804a is formed for each region where the pixel circuit 102 is to be formed. The resist pattern 804 exposes, from the opening 804a, a region where the impurity region 305 is to be formed, and covers the remaining portion (including a region where the impurity region 310 is to be formed) of the substrate 101. A p-type impurity is doped to the substrate 101 through the opening 804a using the resist pattern 804. With this, a part of the impurity region 502 is changed to the p-type impurity region 305. The impurity region 305 vertically divides the impurity region 502. In this step, the p-type impurity is doped to a middle position in the substrate 101. A portion of the impurity region 502 located below the impurity region 305 is already divided by the impurity region 312. Therefore, two portions of the impurity region 502 located below the impurity region 305 become the impurity region 306 and the impurity region 309. A portion of the impurity region 502 located at the same depth as the impurity region 305 becomes the impurity region 310. The concentration of the p-type impurity for forming the impurity region 305 may be higher than the concentration of the p-type impurity for forming the impurity region 312 in the step shown in FIG. 8B.

Then, as shown in FIG. 8D, a resist pattern 805 is formed on the upper surface 101a of the substrate 101. In the resist pattern 805, two openings 805a are formed for each region where the pixel circuit 102 is to be formed. The resist pattern 805 exposes, from the openings 805a, regions where the impurity regions 303 and 304 are to be formed, and covers the remaining portion (including a region where the impurity region 311 is to be formed) of the substrate 101. An n-type impurity is doped to the substrate 101 through the opening 805a using the resist pattern 805. With this, the concentration of the n-type impurity in a part of the impurity region 502 increases. The portions of the impurity region 502 where the concentration of the n-type impurity has increased become the regions 303 and 304, and a portion between the regions 303 and 304 (a portion where the n-type impurity was not doped) becomes the impurity region 311. In this step, the n-type impurity is doped to a shallow position (a position corresponding to the layer 301 of the conversion element arrangement region 201) in the substrate 101. Instead of or in addition to the step shown in FIG. 8D, the above-described step shown in FIG. 5E may be performed.

Figure 8E:
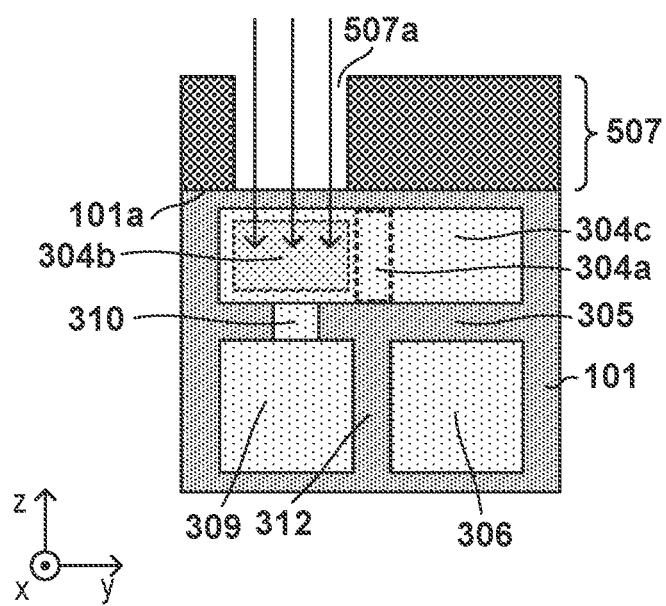

Then, as shown in FIG. 8E, as in the above-described step shown in FIG. 5F, the resist pattern 507 is formed on the upper surface 101a of the substrate 101, and a p-type impurity is doped to the substrate 101 through the opening 507a using the resist pattern 507. With this, the concentration of the p-type impurity in the portion 304b of the impurity region 304 increases.

Second Embodiment

Figure 9A:
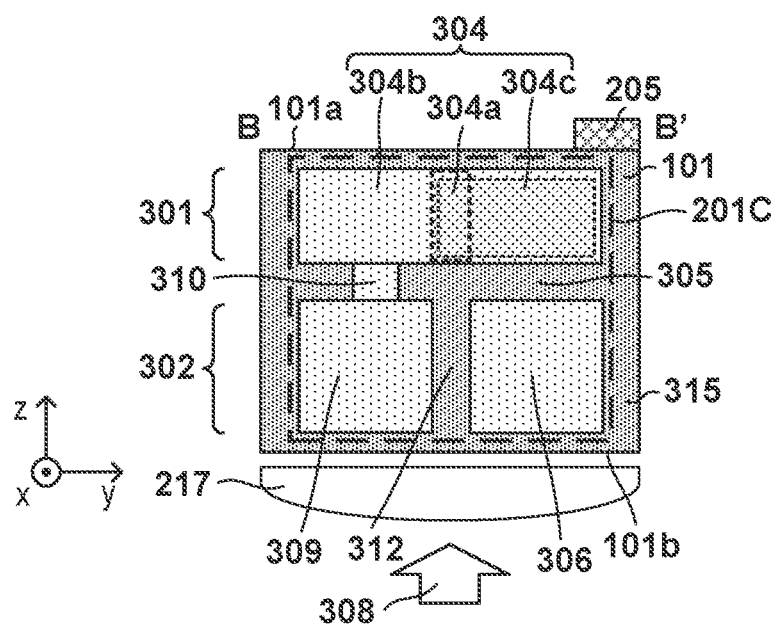
FIGS. 9A to 9C are views for explaining a photoelectric conversion device according to a second embodiment.
Figure 9B:
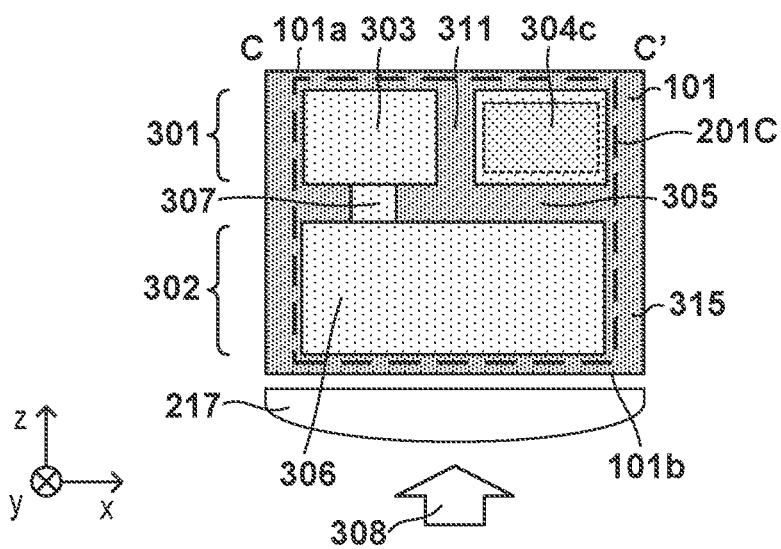
Figure 9C:
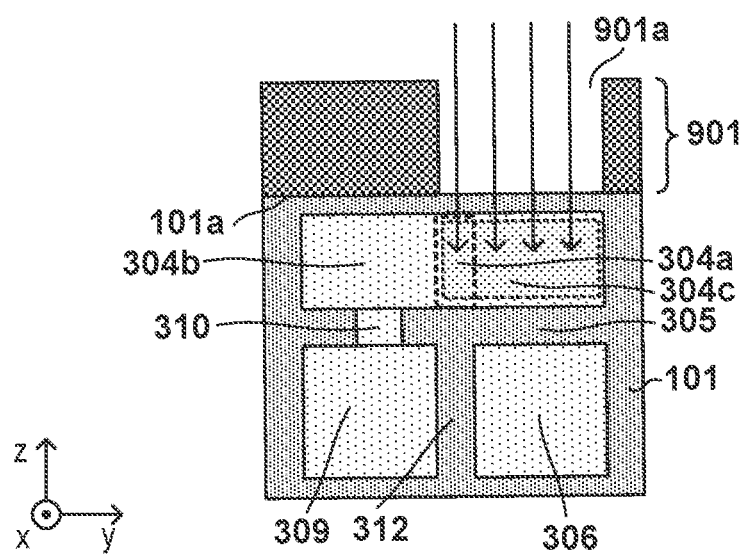

With reference to FIG. 9A to 9C, a photoelectric conversion device 100 according to a second embodiment will be described. Differences from the first embodiment will mainly be described below. Parts whose descriptions are omitted may be similar to those in the first embodiment. This embodiment may be combined with the first embodiment.

FIG. 9A shows a sectional view of a conversion element arrangement region 201C at the position shown in FIG. 4C of the first embodiment. FIG. 9B shows a sectional view of the conversion element arrangement region 201C at the position shown in FIG. 4D of the first embodiment. In portions 304a and 304c of an impurity region 304 of this embodiment, the concentration of an impurity of the same conductivity type (n-type in this embodiment) as signal charges is higher than in a portion 304b of the impurity region 304. With the concentration distribution as described above, as in the first embodiment, the signal charge transport path in the impurity region 304 has a potential distribution that monotonically changes so as to transport signal charges from the portion 304b to the portion 304c. Accordingly, this embodiment has an effect similar to that in the first embodiment.

FIG. 9C is a view for explaining a manufacturing method of the photoelectric conversion device 100 according to this embodiment. FIG. 9C shows a sectional view of a substrate 101 halfway through the manufacturing of the photoelectric conversion device 100 at a position corresponding to the sectional view of FIG. 4C. In this embodiment, after performing the steps shown in FIGS. 5A to 5E of the first embodiment, a step described in FIG. 9C is performed.

As shown in FIG. 9C, a resist pattern 901 is formed on the upper surface 101a of the substrate 101. In the resist pattern 901, an opening 901a is formed for each region where a pixel circuit 102 is to be formed. The resist pattern 901 exposes, from the opening 901a, a part (a part corresponding to the portions 304a and 304c) of the impurity region 304, and covers the remaining part of the substrate 101. An n-type impurity is doped to the substrate 101 through the opening 901a using the resist pattern 901. With this, the concentration of the n-type impurity in each of the portions 304a and 304c of the impurity region 304 increases.

In the embodiment described above, the n-type impurity is doped only to the portions 304a and 304c of the impurity region 304 of a photoelectric conversion element 203 of a cross pixel circuit 102C in the step shown in FIG. 9C. In addition to this, in the step shown in FIG. 9C, the n-type impurity may also be doped to portions 303a and 303c of an impurity region 303 of a photoelectric conversion element 202 of the cross pixel circuit 102C. With this, in the portions 303a and 303c of the impurity region 303, the concentration of the impurity of the same conductivity type (n-type in this embodiment) as signal charges becomes higher than in a portion 303b of the impurity region 303. When the impurity concentration distribution in the impurity region 303 of the photoelectric conversion element 202 is similar to that in the impurity region 304 of the photoelectric conversion element 203, a variation in signal charge transport characteristic (the maximum amount of transferable charges or the like) between the photoelectric conversion elements decreases. Further, in the step shown in FIG. 9C, the n-type impurity may also be doped to portions of the impurity regions 303 and 304 of the photoelectric conversion elements 202 and 203 of a parallel pixel circuit 102P away from gate electrodes 204 and 205, respectively. With this, a variation in signal charge transport characteristic (the maximum amount of transferable charges or the like) between the two types of pixel circuits decreases.

Third Embodiment

Figure 10A:
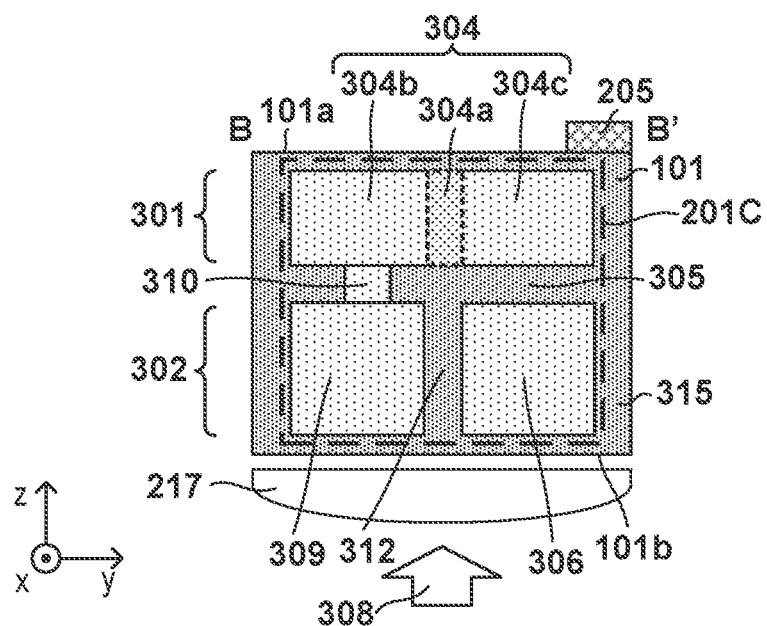
FIGS. 10A and 10B are views for explaining a photoelectric conversion device according to a third embodiment.
Figure 10B:
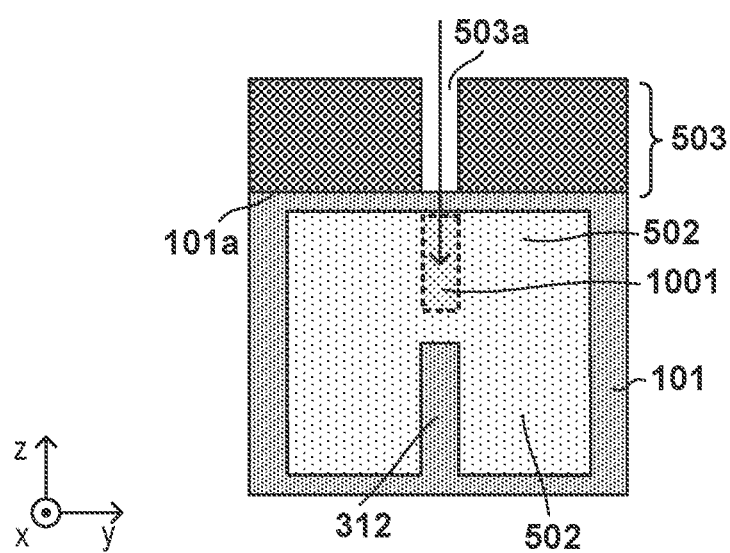

With reference to FIGS. 10A and 10B, a photoelectric conversion device 100 according to a third embodiment will be described. Differences from the first embodiment will mainly be described below. Parts whose descriptions are omitted may be similar to those in the first embodiment. This embodiment may be combined with the first embodiment.

FIG. 10A shows a sectional view of a conversion element arrangement region 201C at the position shown in FIG. 4C of the first embodiment. In a portion 304a of an impurity region 304 of this embodiment, the concentration of an impurity of the same conductivity type (n-type in this embodiment) as signal charges is higher than in a portion 304b of the impurity region 304. With the concentration distribution as described above, as in the first embodiment, the signal charge transport path in the impurity region 304 has a potential distribution that monotonically changes so as to transport signal charges from the portion 304b to a portion 304c. Accordingly, this embodiment has an effect similar to that in the first embodiment.

FIG. 10B is a view for explaining a manufacturing method of the photoelectric conversion device 100 according to this embodiment. FIG. 10B shows a sectional view of a substrate 101 halfway through the manufacturing of the photoelectric conversion device 100 at a position corresponding to the sectional view of FIG. 4C. In this embodiment, after performing the steps shown in FIGS. 5A and 5B of the first embodiment, a step described in FIG. 10B is performed, and then the steps shown in FIGS. 5C to 5E are performed.

As shown in FIG. 10B, an n-type impurity is doped to a portion 1001 of an impurity region 502 located at a position shallower than an impurity region 312 by using a resist pattern 503 formed in the step shown in FIG. 5B. With this, the concentration of the n-type impurity in the portion 1001 of the impurity region 502 increases. The portion 1001 of the impurity region 502 includes a portion corresponding to the portion 304*a* of the impurity region 304.

In the embodiment described above, since the common resist pattern 503 is used in the step shown in FIG. 5B and the step shown in FIG. 10B, the n-type impurity is also doped to a portion 303*a* of an impurity region 303 of a photoelectric conversion element 202 of a cross pixel circuit 102C. With this, in the portion 303*a* and a portion 303*c* of the impurity region 303, the concentration of the impurity of the same conductivity type (n-type in this embodiment) as signal charges becomes higher than in a portion 303*b* of the impurity region 303. When the impurity concentration distribution in the impurity region 303 of the photoelectric conversion element 202 is similar to that in the impurity region 304 of the photoelectric conversion element 203, a variation in signal charge transport characteristic (the maximum amount of transferable charges or the like) between the photoelectric conversion elements decreases. Further, the n-type impurity is also doped to portions of the impurity regions 303 and 304 of the photoelectric conversion elements 202 and 203 of a parallel pixel circuit 102P away from gate electrodes 204 and 205, respectively. With this, a variation in signal charge transport characteristic (the maximum amount of transferable charges or the like) between the two types of pixel circuits decreases.

Fourth Embodiment

With reference to FIGS. 11A to 11F, a photoelectric conversion device 100 according to a fourth embodiment will be described. Differences from the first embodiment will mainly be described below. Parts whose descriptions are omitted may be similar to those in the first embodiment. This embodiment may be combined with any one of the first embodiment to the third embodiment.

Figure 11A:
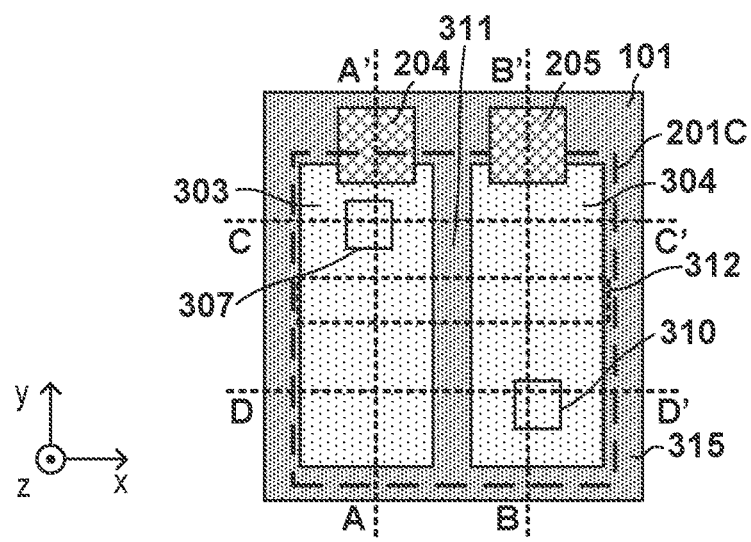
FIGS. 11A to 11F are views for explaining a photoelectric conversion device according to a fourth embodiment.
Figure 11B:
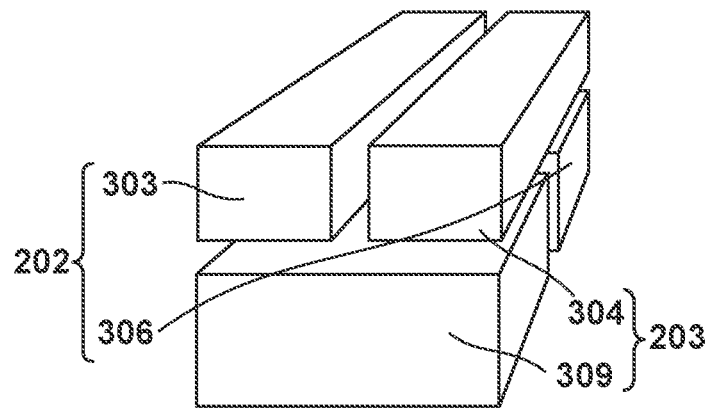
Figure 11C:
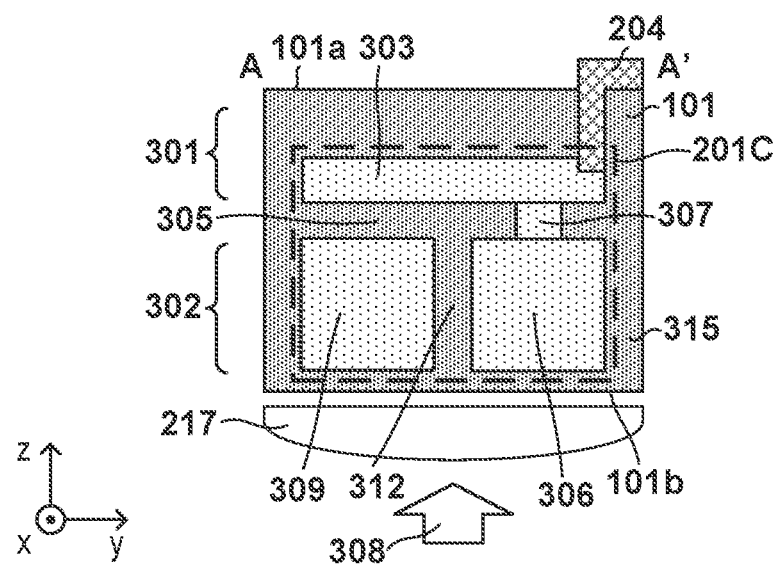
Figure 11D:
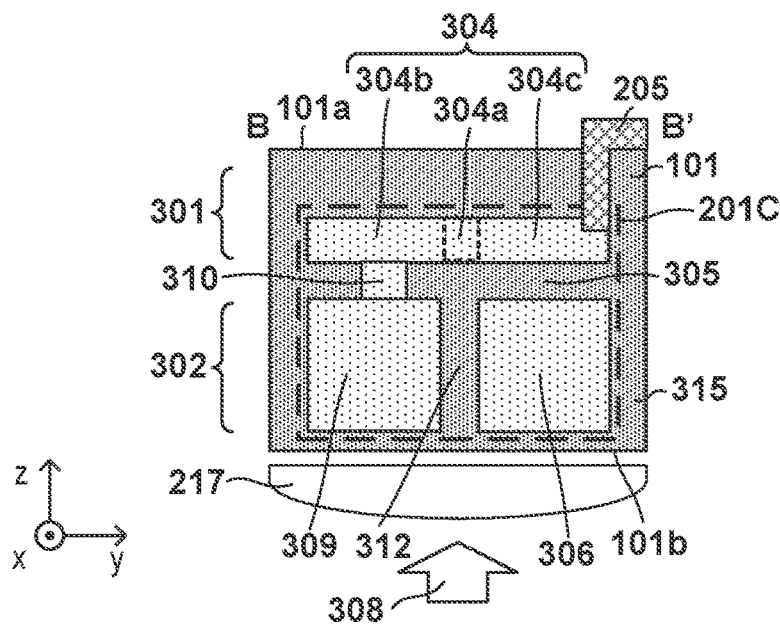
Figure 11E:
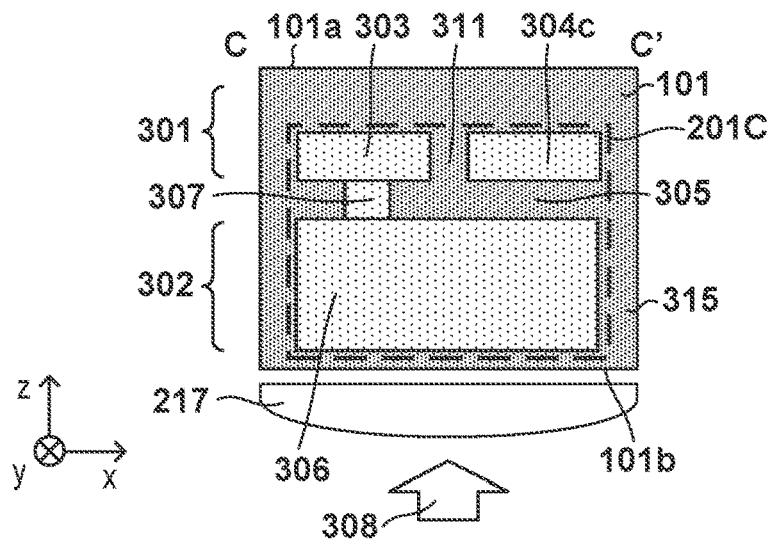
Figure 11F:
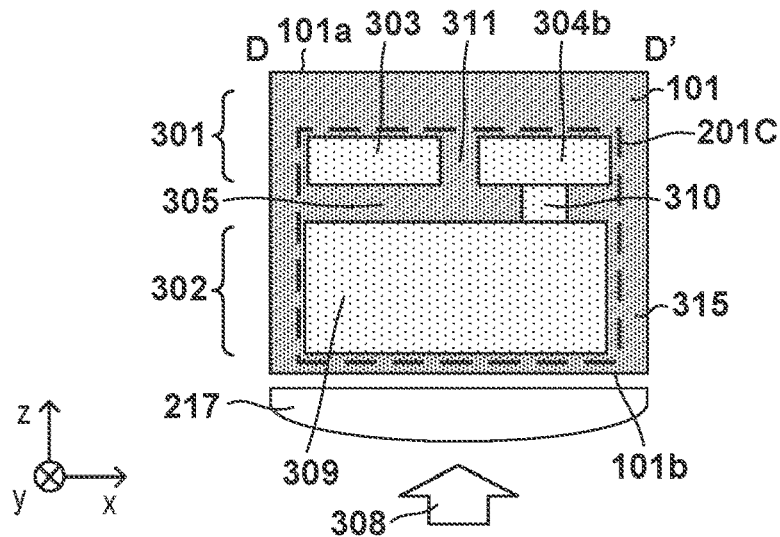
Figure 12A:
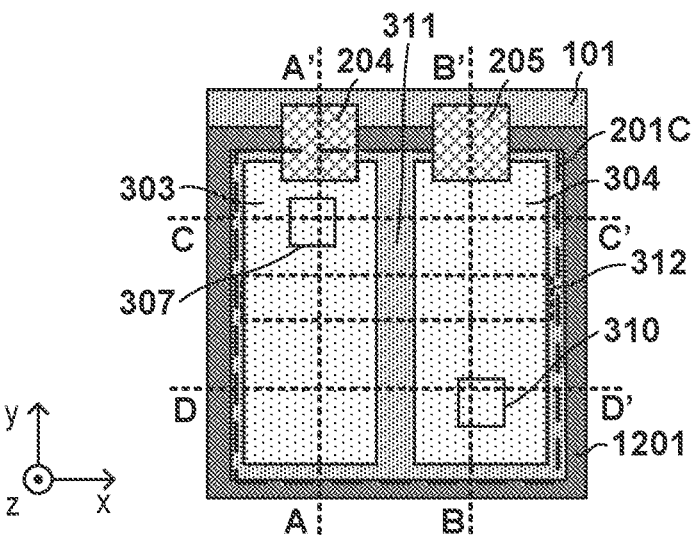
FIGS. 12A to 12F are views for explaining a photoelectric conversion device according to a fifth embodiment.
Figure 12B:
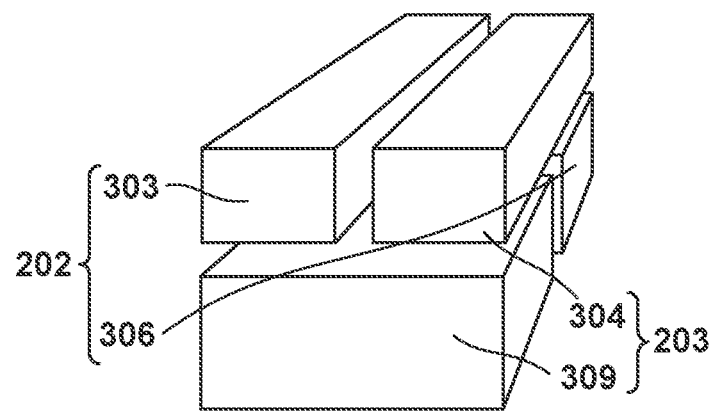
Figure 12C:
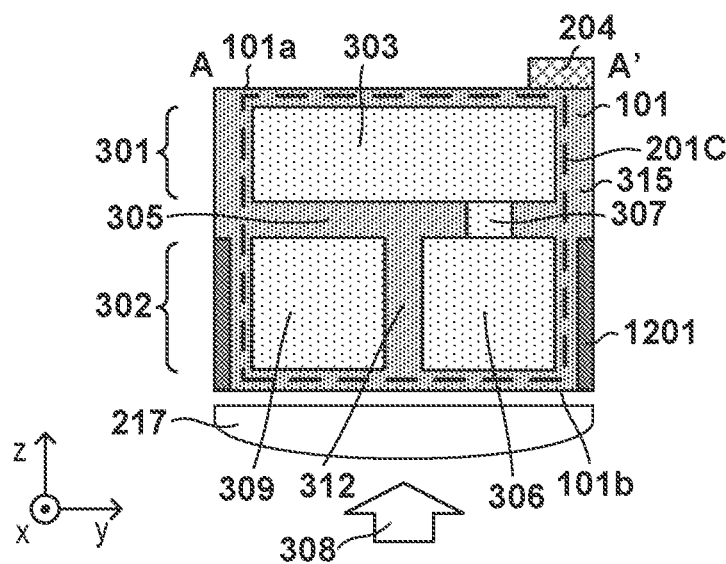
Figure 12D:
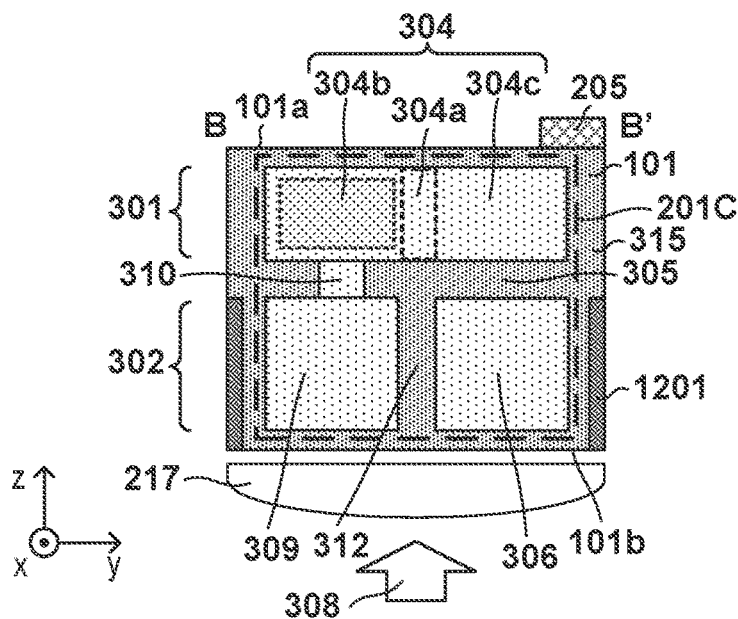
Figure 12E:
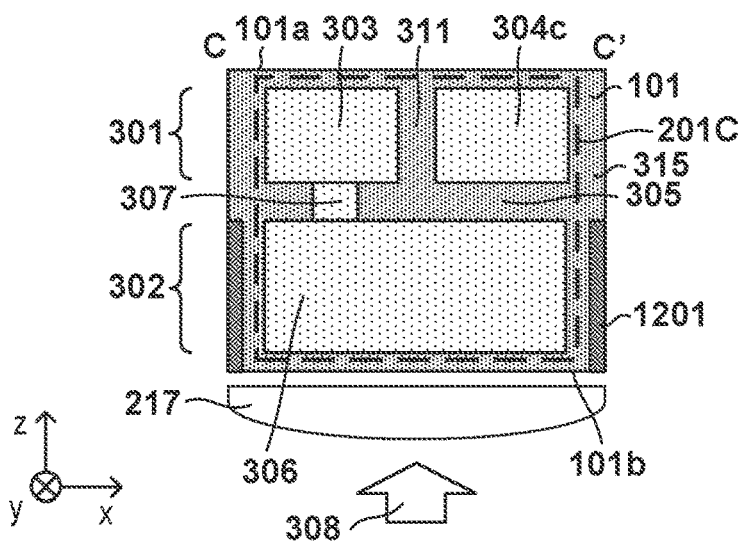
Figure 12F:
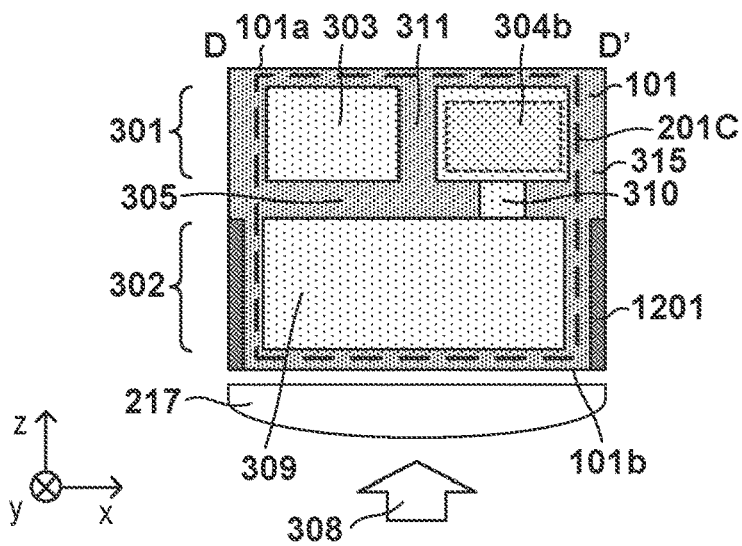

FIGS. 11A to 11F are views corresponding to FIGS. 4A to 4F of the first embodiment, respectively. This embodiment is different from the first embodiment in that each of gate electrodes 204 and 205 has a vertical structure. The vertical structure of the gate electrode 204 may be a structure in which the gate electrode 204 protrudes in an opening formed in a substrate 101 as shown in FIG. 11C. The gate electrode 204 extends in the vertical direction (the negative direction of the z-axis) down to a position adjacent to an impurity region 303. The gate electrode 204 may be adjacent to any position in the impurity region 303. The above description of the gate electrode 204 also applies to the gate electrode 205.

As shown in the graph 602 on the right side in FIG. 6, the concentration of an doped p-type impurity increases as it is closer to an upper surface 101*a* of the substrate 101. Since each of the gate electrodes 204 and 205 has the vertical structure, the impurity region 303 and an impurity region 304 can be formed at a deep position (a position away from the upper surface 101*a*) in the substrate 101 as compared to the first embodiment. Therefore, it is possible to suppress the formation of a potential barrier as described in FIG. 7A. As a result, the signal charge transport path in the impurity region 304 has a potential distribution that monotonically changes so as to transport signal charges from a portion 304*b* to a portion 304*c*.

Fifth Embodiment

With reference to FIGS. 12A to 12F, a photoelectric conversion device 100 according to a fifth embodiment will be described. Differences from the first embodiment will mainly be described below. Parts whose descriptions are omitted may be similar to those in the first embodiment. This embodiment may be combined with any one of the first embodiment to the fourth embodiment.

FIGS. 12A to 12F are views corresponding to FIGS. 4A to 4F of the first embodiment, respectively. This embodiment is different from the first embodiment in that it further includes a deep trench element separation structure 1201 on the side of each of an impurity region 306 and an impurity region 309. The deep trench element separation structure 1201 may be arranged in both a parallel pixel circuit 102P and a cross pixel circuit 102C. A layer 302 of a substrate 101 may have a certain thickness such that incident light does not reach a layer 301. If the layer 302 of the substrate 101 is thick, diagonally incident light may cause color mixing between the pixels. Particularly, a crosstalk may occur in which an electron generated by photoelectric conversion crosses the potential barrier of an impurity region 315 and enters an adjacent pixel. In this embodiment, the deep trench element separation structure 1201 can suppress the color mixing as described above. The deep trench element separation structure 1201 may have a depth similar to those of the impurity regions 306 and 309. Alternatively, the deep trench element separation structure 1201 may reach a lower surface 101*b* of the substrate 101.

Other Embodiments

An embodiment of an equipment 1300 including a semiconductor device 1303 will be described in detail with reference to FIG. 13A. The semiconductor device 1303 may be a photoelectric conversion device according to any one of the above-described embodiments. The semiconductor device 1303 may include a semiconductor device 1301 and a package 1302 accommodating the semiconductor device 1301. The package 1302 may include a base on which the semiconductor device 1301 is fixed and a cover made of glass or the like facing the semiconductor device 1301. The package 1302 may further include a bonding member such as a bonding wire and bump for connecting a terminal of the base and a terminal (bonding pad) of the semiconductor device 1301.

The equipment 1300 may include at least one selected from the group consisting of an optical device 1304, a control device 1305, a processing device 1306, a display device 1307, a storage device 1308, and a mechanical device 1309. The optical device 1304 is implemented by, for example, a lens, a shutter, and a mirror. The control device 1305 controls the semiconductor device 1303. The control device 1305 is, for example, a semiconductor device such as a Field Programmable Gate Array (FPGA) or an Application Specific Integrated Circuit (ASIC).

The processing device 1306 processes a signal output from the semiconductor device 1303. The processing device 1306 is a semiconductor device such as a Central Processing Unit (CPU) or an ASIC for forming an Analog Front End (AFE) or a Digital Front End (DFE). The display device 1307 is an Electro-Luminescence (EL) display device or a liquid crystal display device that displays information (image) obtained by the semiconductor device 1303. The storage device 1308 is a magnetic device or a semiconductor device that stores the information (image) obtained by the semiconductor device 1303. The storage device 1308 is a volatile memory such as a Static Random Access Memory (SRAM) or a Dynamic Random Access Memory (DRAM) or a nonvolatile memory such as a flash memory or a hard disk drive.

The mechanical device 1309 includes a moving or propulsion unit such as a motor or an engine. In the equipment 1300, the signal output from the semiconductor device 1303 is displayed on the display device 1307 and is transmitted to an external device by a communication device (not shown) included in the equipment 1300. Hence, the equipment 1300 may further include the storage device 1308 and the processing device 1306 in addition to the memory circuits and arithmetic circuits included in the semiconductor device 1303. The mechanical device 1309 may be controlled based on the signal output from the semiconductor device 1303.

In addition, the equipment 1300 is suitable for an electronic equipment such as an information terminal (for example, a smartphone or a wearable terminal) which has a shooting function or a camera (for example, an interchangeable lens camera, a compact camera, a video camera, or a monitoring camera). The mechanical device 1309 in the camera may drive the components of the optical device 1304 in order to perform zooming, an in-focus operation, and a shutter operation. Alternatively, the mechanical device 1309 in the camera may move the semiconductor device 1303 in order to perform an anti-vibration operation.

Furthermore, the equipment 1300 can be a transportation equipment such as a vehicle, a ship, or an airplane. The mechanical device 1309 in a transportation equipment can be used as a moving device. The equipment 1300 as a transportation equipment may be used as a device that transports the semiconductor device 1303 or a device that uses an image capturing function to assist and/or automate driving (steering). The processing device 1306 for assisting and/or automating driving (steering) may perform, based on the information obtained by the semiconductor device 1303, processing for operating the mechanical device 1309 as a moving device. Alternatively, the equipment 1300 may be a medical equipment such as an endoscope, a measurement equipment such as an analysis distance measurement sensor, an analysis equipment such as an electron microscope, or an office equipment such as a copy machine.

An embodiment of an image capturing system and a moving body will be described with reference to FIGS. 13B and 13C. FIG. 13B shows an example of an image capturing system 1310 concerning an in-vehicle camera. The image capturing system 1310 includes a photoelectric conversion device 1311. The photoelectric conversion device 1311 may be any one of the photoelectric conversion devices described in the above embodiments. The image capturing system 1310 includes an image processing unit 1312 as a processing device that performs image processing for a plurality of image data acquired by the photoelectric conversion device 1311. The image capturing system 1310 also includes a parallax acquisition unit 1313 as a processing device that calculates a parallax (the phase difference of a parallax image) from the plurality of image data acquired by the photoelectric conversion device 1311. In addition, the image capturing system 1310 includes a distance acquisition unit 1314 as a processing device that calculates the distance to a target object based on the calculated parallax, and a collision determination unit 1315 as a processing device that determines, based on the calculated distance, whether there is a possibility of a collision. In this example, the parallax acquisition unit 1313 and the distance acquisition unit 1314 are examples of an information acquisition means for acquiring information such as distance information to a target object. That is, the distance information is information about a parallax, a defocus amount, a distance to a target object, and the like. The collision determination unit 1315 may determine the possibility of a collision by using one of these pieces of distance information. Each of the above-described various kinds of processing devices may be implemented by specially designed hardware or by general-purpose hardware for performing arithmetic processing based on a software module. Alternatively, each processing device may be implemented by an FPGA, an ASIC, or the like or by a combination thereof.

The image capturing system 1310 is connected to a vehicle information acquisition device 1316, and can acquire vehicle information such as a vehicle speed, a yaw rate, and a steering angle. The image capturing system 1310 is connected to a control ECU 1317 as a control device that outputs a control signal to generate a braking force to the vehicle based on the determination result of the collision determination unit 1315. That is, the control ECU 1317 is an example of a moving body control means for controlling a moving body based on distance information. The image capturing system 1310 is also connected to a warning device 1318 that generates a warning to the driver based on the determination result of the collision determination unit 1315. For example, if the collision determination unit 1315 determines as the determination result that the possibility of a collision is high, the control ECU 1317 performs vehicle control to avoid a collision or reduce damage by, for example, applying the brake, returning the accelerator, or suppressing the engine output. The warning device 1318 warns the user by, for example, generating an alarm sound or the like, displaying warning information on the screen of a car navigation system or the like, or vibrating a seat belt or steering wheel.

In this embodiment, the image capturing system 1310 captures the periphery, for example, the front or rear of the vehicle. FIG. 13C shows the image capturing system 1310 in a case in which the front of the vehicle (image capturing range 1319) is captured. The vehicle information acquisition device 1316 sends an instruction to operate the image capturing system 1310 and execute image capturing.

An example in which control is performed to avoid a collision with another vehicle has been described above. However, the image capturing system can also be applied to control for performing automated driving to follow another vehicle or control for performing automated driving to prevent the vehicle from drifting outside a lane. Furthermore, the image capturing system can be applied not only to a vehicle such as an automobile but also to, for example, a moving body (transportation equipment) such as a ship, an airplane, or an industrial robot. The moving device in the moving body (transportation equipment) includes various kinds of moving means such as an engine, motor, wheels, and propellers. In addition, the image capturing system can be applied not only to the moving body but also to an equipment that widely uses object recognition, such as Intelligent Transportation System (ITS).

According to the embodiments described above, the signal charge transport efficiency in a photoelectric conversion element improves.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-132950, filed Aug. 17, 2021, which is hereby incorporated by reference herein in its entirety.

What is claimed is:

1. A photoelectric conversion device comprising:
a substrate including a first surface, a second surface on an opposite side of the first surface, a first layer between the first surface and the second surface, and a second layer between the first layer and the second surface; and
a plurality of pixel circuits formed in the substrate,
wherein each of the plurality of pixel circuits includes a first photoelectric conversion element, a second photoelectric conversion element, a first transfer gate configured to transfer signal charges from the first photoelectric conversion element, and a second transfer gate configured to transfer signal charges from the second photoelectric conversion element,
the first photoelectric conversion element includes:
a first impurity region located in the first layer and configured to generate signal charges corresponding to incident light, and
a second impurity region located in the second layer and configured to transport the signal charges generated in the first impurity region toward the first transfer gate,
the second photoelectric conversion element includes:
a third impurity region located in the first layer and configured to generate signal charges corresponding to incident light, and
a fourth impurity region located in the second layer and configured to transport the signal charges generated in the third impurity region toward the second transfer gate,
the first layer further includes a first separation region located between the first impurity region and the third impurity region,
the second layer further includes a second separation region located between the second impurity region and the fourth impurity region,
in at least one pixel of the plurality of pixel circuits:
the first separation region and the second separation region extend in directions different from each other in a planar view with respect to the first surface,
the second impurity region includes a first portion overlapping the first separation region in the planar view with respect to the first surface, a second portion adjacent to the first transfer gate, and a third portion located on an opposite side of the second portion with respect to the first portion, and
the second impurity region has a potential distribution monotonically decreasing from the third portion to the second portion for signal charges, and
a concentration of an impurity of a conductivity type opposite to a conductivity type of signal charges is higher in the third portion of the second impurity region than in the second portion of the second impurity region.

2. The device according to claim 1, wherein in the at least one pixel:
the fourth impurity region includes a fourth portion overlapping the first separation region in the planar view with respect to the first surface, a fifth portion adjacent to the second transfer gate, and a sixth portion located on an opposite side of the fifth portion with respect to the fourth portion,
signal charges are transported from the third impurity region to the fifth portion of the fourth impurity region, and
the concentration of the impurity of the opposite conductivity type is higher in the sixth portion of the fourth impurity region than in the fifth portion of the fourth impurity region.

3. The device according to claim 1, wherein a concentration of an impurity of the same conductivity type as signal charges is higher in the first portion of the second impurity region than in the third portion of the second impurity region.

4. The device according to claim 1, wherein a concentration of an impurity of the same conductivity type as signal charges is higher in the second portion of the second impurity region than in the third portion of the second impurity region.

5. The device according to claim 3, wherein in the at least one pixel:
the fourth impurity region includes a fourth portion overlapping the first separation region in the planar view with respect to the first surface, a fifth portion adjacent to the second transfer gate, and a sixth portion located on an opposite side of the fifth portion with respect to the fourth portion,
signal charges are transported from the third impurity region to the fifth portion of the fourth impurity region, and
the concentration of the impurity of the same conductivity type is higher in one of the fourth portion and the fifth portion of the fourth impurity region than in the sixth portion of the fourth impurity region.

6. The device according to claim 1, wherein each of the first transfer gate and the second transfer gate has a vertical structure.

7. The device according to claim 1, wherein the substrate further includes a deep trench element separation structure on a side of the first impurity region.

8. The device according to claim 1, wherein the substrate further includes a third separation region located between the second impurity region and the third impurity region.

9. The device according to claim 1, wherein in one or more pixels of the plurality of pixel circuits, the first separation region and the second separation region extend in the same direction in the planar view with respect to the first surface.

10. The device according to claim 1, wherein in each of the plurality of pixel circuits:
the first transfer gate is arranged in a first direction with respect to the second impurity region, and
the second transfer gate is arranged in the first direction with respect to the fourth impurity region.

11. An equipment comprising:
a photoelectric conversion device according to claim 1;
and at least one selected from the group consisting of:
an optical device corresponding to the photoelectric conversion device,
a control device configured to control the photoelectric conversion device,
a processing device configured to process a signal output from the photoelectric conversion device,
a display device configured to display information acquired by the photoelectric conversion device,
a storage device configured to store the information acquired by the photoelectric conversion device, and a mechanical device configured to operate based on the information acquired by the photoelectric conversion device.

* * * * *